(12) United States Patent
Li et al.

(10) Patent No.: US 10,660,470 B2
(45) Date of Patent: May 26, 2020

(54) DOUBLE WALLED DOMED ELECTRIC ROASTING OVEN

(71) Applicant: LAM & SONS LLC, Cheyenne, WY (US)

(72) Inventors: George T. C. Li, Reno, NV (US); Eric Li, Reno, NV (US)

(73) Assignee: Lam & Sons, LLC, Cheyenne, WY (US)

( * ) Notice: Subject to any disclaimer, the term of this patent is extended or adjusted under 35 U.S.C. 154(b) by 344 days.

(21) Appl. No.: 15/462,791

(22) Filed: Mar. 17, 2017

(65) Prior Publication Data

US 2017/0295993 A1  Oct. 19, 2017

Related U.S. Application Data

(63) Continuation of application No. 15/058,297, filed on Mar. 2, 2016.

(51) Int. Cl.
   *A47J 37/06* (2006.01)
   *A23L 5/10* (2016.01)

(52) U.S. Cl.
   CPC ............ *A47J 37/0629* (2013.01); *A23L 5/15* (2016.08); *A47J 37/0664* (2013.01)

(58) Field of Classification Search
   CPC ...... A47J 37/0629; A47J 37/0664; A23L 5/15
   See application file for complete search history.

(56) References Cited

U.S. PATENT DOCUMENTS

| | | | | |
|---|---|---|---|---|
| 1,774,996 A | * | 9/1930 | Rohrmann | A47J 37/103 212/252 |
| 2,187,888 A | * | 1/1940 | Nachumsohn | A47J 37/015 126/275 E |
| 2,497,241 A | * | 2/1950 | Spigel | A47J 37/103 219/402 |
| 2,956,144 A | * | 10/1960 | Woodman | H05B 6/6402 219/739 |
| 3,619,563 A | * | 11/1971 | Hirst | A47J 36/2483 219/202 |
| 4,051,836 A | * | 10/1977 | Lagunilla-Leca | A47J 39/00 126/275 R |
| 5,315,922 A | * | 5/1994 | Keller | A47J 36/06 126/273 R |

(Continued)

*Primary Examiner* — Steven N Leff
(74) *Attorney, Agent, or Firm* — Donn K. Harms

(57) ABSTRACT

A double walled domed electric roasting oven and method of use is described. The double walled domed electric roasting oven includes a double walled dome lid, a base pan, a temperature controlling component and a heating element. The double walled dome lid is formed by coupling a domed inner wall and a domed outer wall with a fastener. The double walled dome lid has a dome lid height. The base pan interfaces with a bottom of the double walled dome lid. The base pan has a base pan height. The dome lid height is at least 2.5 times greater than the base pan height. The temperature controlling component is disposed on an exterior outer wall of the double walled dome lid. The temperature controlling component includes a heating element that is electrically coupled to the temperature controlling component. The heating element is radially disposed about the exterior inner wall surface of the domed inner wall and positioned within the domed outer wall.

19 Claims, 19 Drawing Sheets

(56) References Cited

U.S. PATENT DOCUMENTS

| | | | | |
|---|---|---|---|---|
| 5,896,808 | A * | 4/1999 | Graur | A47J 37/0623 219/386 |
| 6,288,369 | B1 * | 9/2001 | Sherman | A47J 37/0635 219/405 |
| 6,414,274 | B1 * | 7/2002 | Mahyari | A47J 37/103 219/386 |
| 6,747,250 | B1 * | 6/2004 | Cha | A47J 37/0623 219/386 |
| 7,012,221 | B2 * | 3/2006 | Li | A47J 27/004 219/386 |
| 9,167,930 | B2 * | 10/2015 | Chang | A47J 37/103 |
| 9,333,472 | B2 * | 5/2016 | Paget | A47J 43/044 |
| 2003/0116556 | A1 * | 6/2003 | Li | A47J 27/004 219/433 |
| 2003/0132216 | A1 * | 7/2003 | Li | A47J 37/0623 219/432 |
| 2004/0007564 | A1 * | 1/2004 | Li | A47J 27/004 219/391 |
| 2004/0094532 | A1 * | 5/2004 | Li | A47J 27/18 219/432 |
| 2014/0246419 | A1 * | 9/2014 | Li | B23P 11/00 219/395 |
| 2014/0246420 | A1 * | 9/2014 | Paget | A47J 43/044 219/438 |

* cited by examiner

DOUBLE WALLED DOMED ELECTRIC ROASTING OVEN

CROSS REFERENCE

The patent application is a Continuation-In-Part of patent application Ser. No. 15/058,297 filed on Mar. 2, 2016 and entitled ELECTRIC ROASTING OVEN HAVING A DOMED LID AND METHOD OF USE, which is hereby incorporated by reference.

FIELD

The present disclosure relates to a double walled domed electric roasting oven. More particularly, the present disclosure relates to a double walled domed electric roasting oven that includes a heating element that is radially disposed between a domed inner wall lid and a domed outer wall lid.

BACKGROUND

A variety of stand-alone roasting ovens have been developed to roast different food products (e.g., turkey, chicken, and the like) without the use of a conventional kitchen oven. These stand-alone roasting ovens are also referred to as "roaster ovens" or "roasters."

Roaster ovens offer a variety of conveniences including being an energy-efficient alternative to turning on the full-size oven. Roaster ovens also provide an extra cooking space during the holidays. Also, roaster ovens are easier to clean because the roaster pan is dishwasher safe. The roaster oven simplifies gravy preparation because the gravy may be easily simmered in a removable pan, sitting atop a heated roaster oven pan. Roaster ovens may also be used for baking, cooking and serving. Roaster ovens also include a secure-fitting lid that helps trap in heat and moisture. When the lid is removed, the roaster provides convenient access to stir or transfer food to an individual bowl or plate. Generally, the roaster oven also includes a removable rack to easily transport large roasts or turkeys to a serving platter.

Typical roasters include a wrap-around type heating element for applying heat to the sides of the cooking vessel or, alternatively, a bottom heating element arranged in functional relation to the bottom of the cooking well for supplying heat for cooking. Such cooking wells are often constructed of aluminum, stainless steel or enameled steel for reasons of durability and sanitation. However, it is known that both stainless steel and enameled steel have relatively low coefficients of heat conductivity as compared with other metals. This presents a particular problem for cooking vessels of large capacity (i.e. up to 26 quarts). Applying heat only to the bottom or sides of such a large capacity cooking vessel, especially when constructed of stainless steel or enameled steel, may result in the upper portion of the cooking vessel being insufficiently heated. Thus, the food in the upper portion of the cooking vessel may be insufficiently cooked for serving purposes due to the loss of heat in combination with the low rate of heat conductivity and the slow rate at which heat is supplied to the upper portion of the cooking vessel. Often such a cooking vessel lacks top-browning (i.e. to scorch lightly) capability, which is desirable when cooking chicken, turkey or other foodstuffs.

Traditional roasters are unable to effectively brown the top of large birds such as an illustrative turkey, which results in a "white spot" on the top of the large bird. To effectively remove the white spot, the illustrative turkey is removed from the roaster oven and put into a regular over for roasting. This two-step process creates additional work and clean-up and the extra step of cooking in a traditional oven causes the illustrative turkey to lose its moisture and tenderness. Basically, a properly browned turkey that is exposed to the two-step process of using a roasting oven and then a kitchen oven is dry and unappetizing. Alternatively, top heater elements have been implemented in certain roaster ovens as a cure for "white spots," but these create a broiling effect similar to two-step roasting with a conventional oven that dries the turkey undesirably.

Thus, a roasting oven capable of easily and uniformly roasting and browning a top surface of a particular food product is desirable.

SUMMARY

A double walled domed electric roasting oven and method of use is described. The double walled domed electric roasting oven includes a double walled dome lid, a base pan, a temperature controlling component and a heating element. The double walled dome lid is formed by coupling a domed inner wall and a domed outer wall with a fastener. The double walled dome lid has a dome lid height. The base pan interfaces with the bottom of the double walled dome lid. The base pan has a base pan height. The dome lid height is at least 2.5 times greater than the base pan height. The temperature controlling component is disposed on an exterior outer wall of the double walled dome lid. The temperature controlling component includes a heating element that is electrically coupled to the temperature controlling component. The heating element radially disposed about the exterior inner wall surface of the domed inner wall and positioned within the domed outer wall.

In one illustrative embodiment, the domed inner wall includes an interior inner wall surface and the exterior inner wall surface, and the domed outer wall includes an interior outer wall surface and an exterior outer wall surface. Additionally, at least one domed outer wall opening associated with the domed outer wall. Also, a bracket is welded to the exterior inner wall surface and includes at least one bracket opening. The double walled dome lid is formed by coupling the domed inner wall and the domed outer wall with a fastener that passes though the bracket opening and the domed outer wall opening.

In another embodiment, the base pan has a height of greater than 1 inch and less than 2 inches.

In yet another embodiment, the double walled domed electric roasting oven does not include a heating module. In a still further embodiment, the base pan includes a removable heating module that is slidably coupled to the base pan.

In yet a further embodiment, the double walled domed electric roasting oven includes an inner rim that includes a gasket and an outer rim that interlocks with the inner rim and interfaces with the gasket.

In a still further embodiment, the double walled domed electric roasting oven includes an inner rim that receives an outer rim, which generates a seal when the outer rim interlocks with the inner rim.

A safety switch may also be mounted on the domed outer wall. The safety switch interfaces with the base pan when the base pan interfaces with the bottom of the double walled dome lid. The safety switch turns off power that is being transferred the heating element when the double walled domed lid is separated from the base pan.

In some of the embodiment, the double walled dome electric roasting oven has a shape selected from the group consisting of a substantially oval shape, a substantially circular shape, a substantially square shape and a substantially rectangular shape.

FIGURES

The present invention will be more fully understood by reference to the following drawings which are presented for illustrative, not limiting, purposes.

DESCRIPTION

Figure 1:
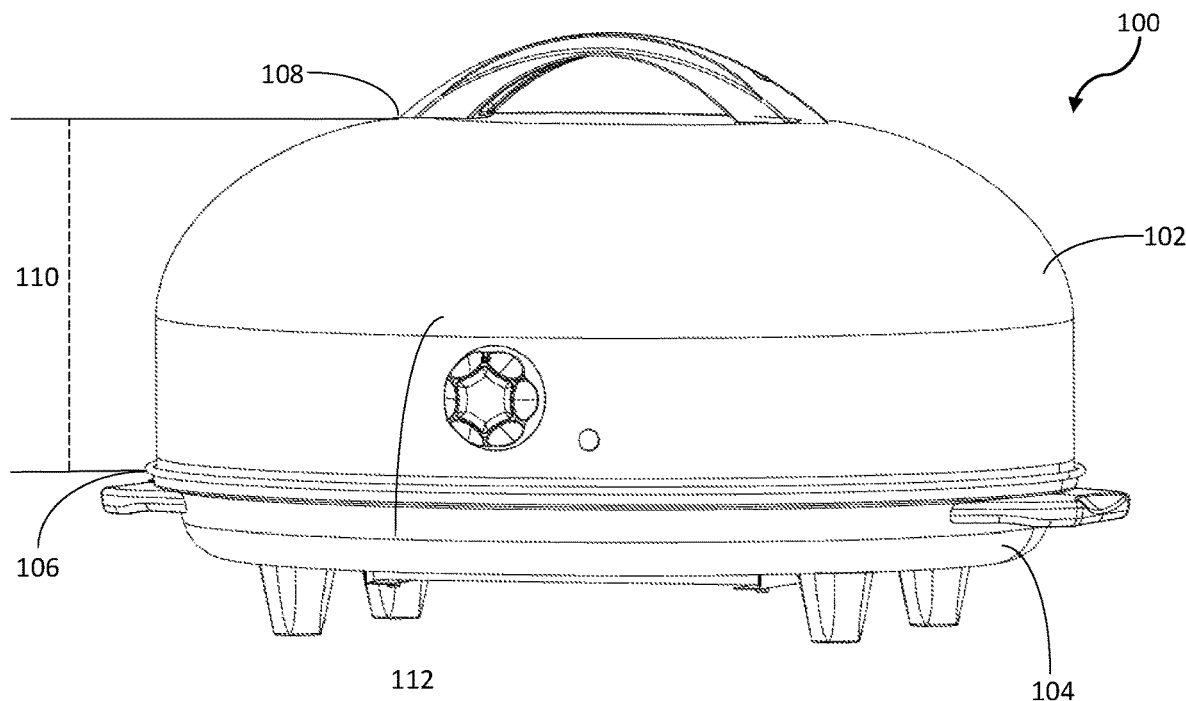
FIG. 1 shows a perspective view of a roasting oven as disclosed herein and in accordance with various illustrative embodiments.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

The illustrative roasting oven disclosed herein may include a double walled dome lid having a rim formed from an interlocking water tight and/or air tight seal between a dome lid outer wall rim and a dome lid inner wall rim. The double walled dome lid is formed by coupling a domed inner wall and a domed outer wall with a fastener. The domed inner wall having an interior surface and an exterior surface. The domed outer wall having an interior surface and an exterior surface. The domed outer wall includes at least one opening. The fastener passes through an opening in a mounting bracket welded to the domed lid inner wall and the at least one opening in the domed outer wall. The "mounting bracket" may also be referred to as a "mounting bar." The mounting bracket includes at least one bracket opening through which the fastener also passes. A handle is integrally attached to the dome lid using the fastener that couples the domed inner wall and the domed outer wall. The handle includes a handle opening and may alternatively be termed a "lid handle" or a "handle component." In various embodiments, the fastener joins the mounting bracket, the dome lid inner wall, the dome lid outer wall, and the lid handle. To do so, the fastener passes through the mounting bracket opening, the domed outer wall opening and the handle opening. A shallow base pan is configured to interface with the dome lid. A heating element is radially disposed within the double walled dome lid. The heating element may be enclosed within (or separated from the food product by) an insulator, such as a fiber glass insulator. A safety switch may be mounted on the domed outer wall at the back of the dome lid, wherein the safety switch engages with the rim of the shallow base pan. Alternatively and equivalently, the safety switch interfaces with the base pan when the base pan interfaces with the bottom of the double walled dome lid. The shallow base pan may further include a bottom flat and removable heater mounted thereto.

The dome lid, lid handle, and a mounting bar fasten integrally to form a dome lid assembly, which maintains a sealed chamber within the dome lid inner and outer walls. The integral dome lid assembly is achieved by welding the mounting bar to the dome lid inner wall and fastening the lid handle to the surface of the dome lid outer wall with one or more fasteners that penetrate through the outer wall and extend to the mounting bar.

In this manner, the attachment of the mounting bar to the dome lid inner wall does not require any breaching, drilling, or puncturing of the inner wall, which in turn would allow water into the interior of the double walled dome lid. Water entering an interior space of a roaster oven is detrimental to the operation and lifetime of the roaster oven because roaster ovens are frequently and commonly manufactured from steel, enameled steel, or some or other readily corrodible substance. When water vapor forms during roaster oven operation or cleaning penetrates even microscopic breaches in the cooking surface, such as a double walled dome lid. Then the water remains within the dome lid for repeated cycles of heating and cooling during roaster oven operation and causes the dome lid to corrode or rust from the interior. Internal corrosion of a dome lid is nearly impossible for an operator to repair because such a repair requires disassembling the dome lid and chemically treating or physically scouring and sanding the corrosion away. Additionally, these caustic or abrasive cleansing methods must be performed without breaching the inner or outer wall.

The dome lid may further include a large and heavy lid configured to retain heat energy. The heating element may be disposed within and about a perimeter of the dome lid and extend from a base of the dome lid to a particular height above the base of the dome lid. The heating element may thus include a "belt" that extends within the dome lid, circumferentially about a perimeter thereof. The heating element may not, therefore, be disposed about a top surface of the dome lid. The double walled dome lid inner and outer walls are substantially vertical, and therefore perpendicular to the shallow base pan. The dome lid height described herein does not include any additional height attributable to a handle attached to the top of the double walled dome lid. The heating belt extends within the portion of the dome lid that is substantially vertical, and thus the heating belt is substantially perpendicular to the shallow base pan and parallel to the dome lid walls.

In an illustrative embodiment, the dome lid height is measured from the bottom of the dome lid rim to the top of the interior surface of the dome lid inner wall. In a further embodiment, the base pan has a base pan height measure from the bottom of the base pan to a shoulder of the base pan.

The dome lid may further include a safety switch mounted on the back of the dome lid. The safety switch works with the rim of the shallow cooking pan. When the dome lid is placed on the cooking pan, the safety switch will be depressed by the rim of the pan, and thereby turns the power on to the dome lid to heat the roaster oven and turkey, bread loaf, foodstuff or other food product. The safety switch prevents the dome lid from burning or charring anything when removed from the shallow base pan for inspection or serving and set down somewhere other than on the shallow base pan or other durable surface.

In operation, the food product may be placed within the base pan and covered by the dome lid to enclose the food product between the base pan and dome lid. The space enclosed between the base pan and dome lid may be referred to herein as a "heating chamber," or simply a "chamber." In some embodiments, when the dome lid is placed on the base pan, the safety switch engages with the base pan rim. The safety switch is depressed by the rim of the pan. In a depressed state, the safety switch opens the heating element circuits and allows a user to provide a cooking input. The cooking input may be received at a temperature controlling component disposed within the dome lid, and the heating element may, in response to the cooking input, heat the chamber of the roasting oven based upon the selected cooking input.

The dome lid may retain and distribute heat over the surface of the food product, and in particular, over much of the food product, including the top surface (e.g., in the case of a turkey, over the turkey breast) of the food product. Moreover, because the heating element is disposed within the dome lid, the roasting oven disclosed herein may uniformly roast and/or brown the food product without exposing the food product to direct heat. The food product may not therefore scorch or burn. The inventors hypothesize that because the dome lid is quite heavy, that the roasting oven is able to develop and maintain an internal pressure that is greater than the air pressure outside of the roasting oven. The roasting oven may therefore operate, to some extent, as a pressure cooker. A food product disposed within the heating chamber may thus brown uniformly as well as retain its moist juiciness during cooking.

With reference now to FIG. 1, a perspective view of a roasting oven 100 is shown. The roasting oven 100 may generally include a dome lid 102 and a tray or shallow base pan 104. The dome lid 102 may interface with the base pan 104 at a base of the dome lid 102 to form a heating chamber. In various embodiments, the dome lid 102 interfaces with the base pan 104 at a base pan shoulder. In a further embodiment, the dome lid 102 interfaces with the base pan 104 at a base pan rim. As described herein, a food product to be roasted and/or browned may be placed within the roasting oven 100. In addition, as described in greater detail below, the dome lid 102 may include a double walled dome lid. In various illustrative embodiments, the dome lid 102 and base pan 104 may include any metallic material such as sheet steel, aluminum, and/or chrome, any ceramic or partially ceramic material, any heat resistant glass, any heat resistant plastic, and/or any other suitable material.

The dome lid 102 may, as shown, rest on a relatively shallow base pan 104. The relatively shallow base pan 104 may also be referred to herein as "base pan," "shallow base pan," and so forth. In some embodiments, the shallow base pan 104 is approximately 1.5" deep or less, alternatively, the base pan 104 may be described as having a height of 1.5" or less. In various embodiments, the base pan height is greater than 1" and less than 2". In other embodiments, the shallow base pan 104 is approximately 1.625" deep or less. In further embodiments, the shallow base pan 104 is 2" deep or less. Accordingly, the dome lid 102 may cover a majority of the food product within the heating chamber, while the base pan 104 may serve, in various illustrative embodiments, primarily to support the food product. The dome lid 102 is therefore large and somewhat heavy, particularly in comparison to the size and weight of the base pan 104. The dome lid has a height 110 taken from a dome lid rim 106 to the top of the dome lid interior 108, and indicated by the dashed line 110. The dome lid height 110 may be at least 2.5 times taller than the shallow base pan 104.

As such, and as described herein, the dome lid 102 is configured to store and radiate heat energy. The inventor hypothesizes that this ratio of dome lid height and base pan height, in combination with heated side walls as disclosed herein cause convection heating without a fan. In various illustrative embodiments, the base pan height is measured from the bottom of the base pan to the shoulder of the base pan. In still further embodiments the base pan height is measured from the bottom of the base pan to the rim of the base pan. This type of heating results in even browning of food products, such as a turkey, which usually requires a convection oven to achieve. Additionally, the heavy dome lid 102 may develop and maintain an internal air pressure within the heating chamber and, as a result, a high temperature within the heating chamber. In other words, the roasting oven 100 may function as a pressure cooker, because the dome lid 102 is sufficiently heavy to maintain an internal air pressure without disruption to a seal formed between the dome lid 102 and base pan 104. A food product, such as a turkey, may therefore brown more uniformly over its outer surface (due to the high temperatures maintained within the heating chamber) as well as retain its juiciness and flavor (due to the air pressure developed within the heating chamber). A temperature controlling component 112 is disposed on the dome lid 102. In various embodiments, the temperature controlling component 112 is disposed on an exterior surface of the dome lid 102.

Figure 2:
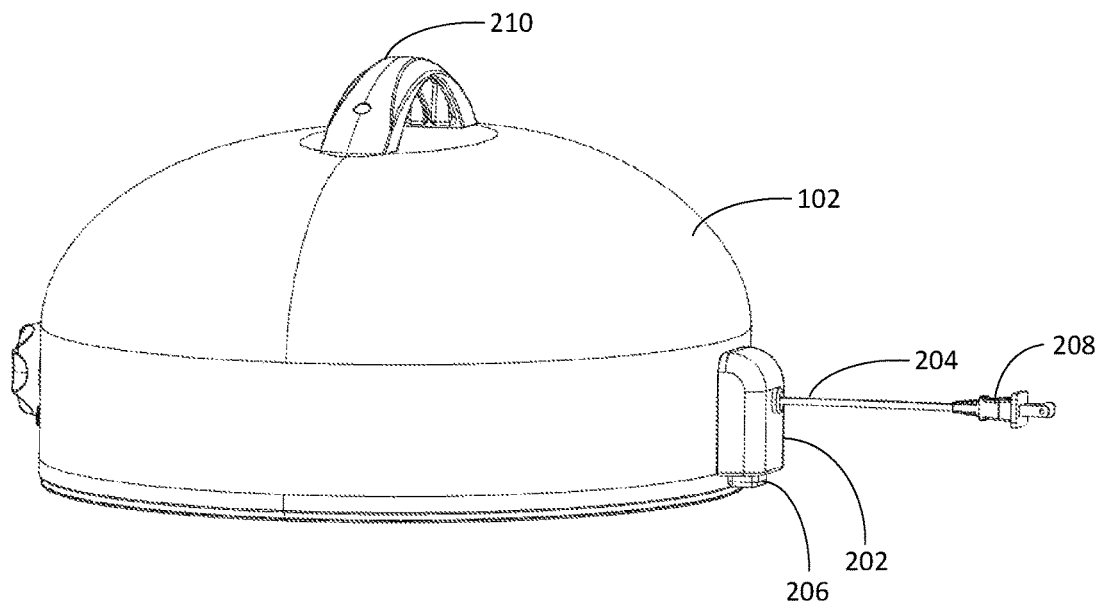
FIG. 2 shows a perspective view of an exterior portion of the dome lid of the roasting oven as disclosed herein and in accordance with various illustrative embodiments.

Referring to FIG. 2, a perspective view of an exterior portion of the dome lid 102 is shown. A safety switch 202 is mounted on the exterior of the dome lid 102. A power cable 204 may extend from the safety switch 202. The safety switch 202 includes a piston element 206 that engages with the base pan 104. In various embodiments, the safety switch 202 can interface with the base pan 104 when the base pan 104 interfaces with the dome lid 102. The power cable 202 may terminate in a plug connector 208, which may be electrically coupled to a standard AC power outlet (e.g., a 120-volt power outlet in North America). The power cable 204 may supply power to the roasting oven 100, and in particular to the heating belt within the double walled dome lid 102. The dome lid 102 may further include a lid handle 210. A roasting oven operator may lift the dome lid 102 away from the base pan 104 using the handle 210 to expose the food product disposed within the roasting oven 100 (and/or to place a food product within the roasting oven 100).

Figure 3:
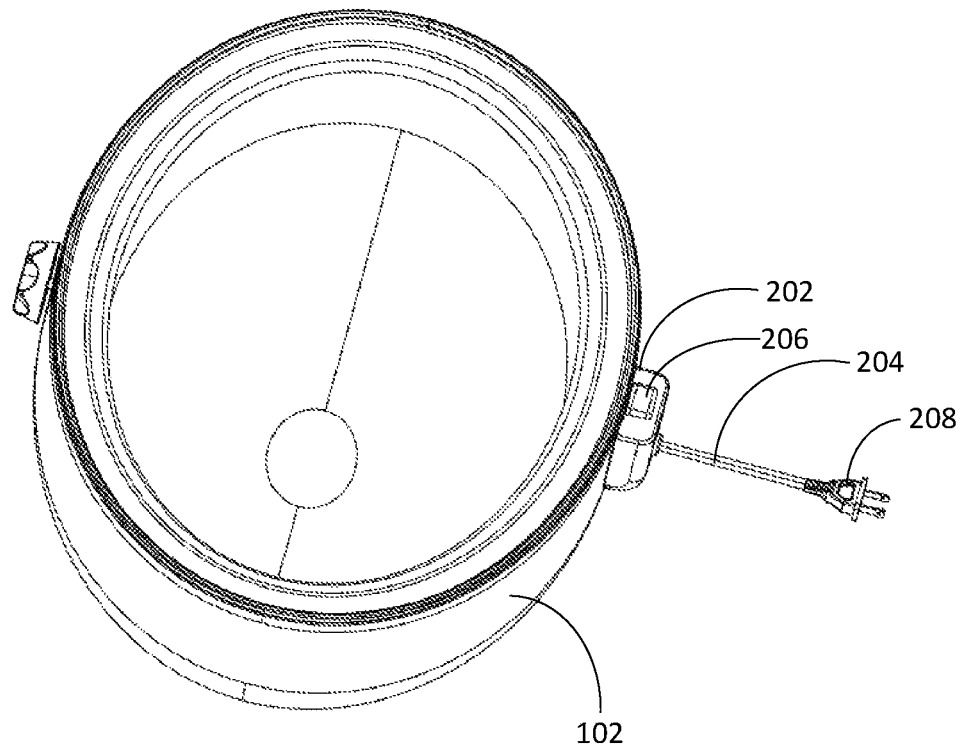
FIG. 3 shows a perspective view of an interior portion the dome lid of the roasting oven as disclosed herein and in accordance with various illustrative embodiments.

FIG. 3 shows a perspective view of an interior portion the dome lid 102. As shown, the interior portion of the dome lid 102 may rise sharply away from the base pan 104, such that the dome lid 102 defines, together with the base pan 104, the heating chamber (as described herein) within which a food product may be placed for roasting and surface browning. Thus, as described herein, the roasting oven 100 may include a very shallow base pan 104 configured to interface with a dome lid 102 that rises from the shallow base pan 104 over the food product to encompass much of the food product. The dome lid 102 may fit over such a shallow base pan 104 to ensure that the food product is adequately browned and cooked by the heating element (described herein) disposed within the dome lid 102. The roasting oven 100 disclosed herein may therefore be regarded as an "upside down" or inverted version of a conventional roasting oven, in that the base pan 104, which in conventional roasting ovens may typically include the main heating element responsible for generating cooking heat, is shallow and merely functions to support the food product, while the dome lid 102 is very deep and functions to heat, brown, and cook the food product.

Figure 4:
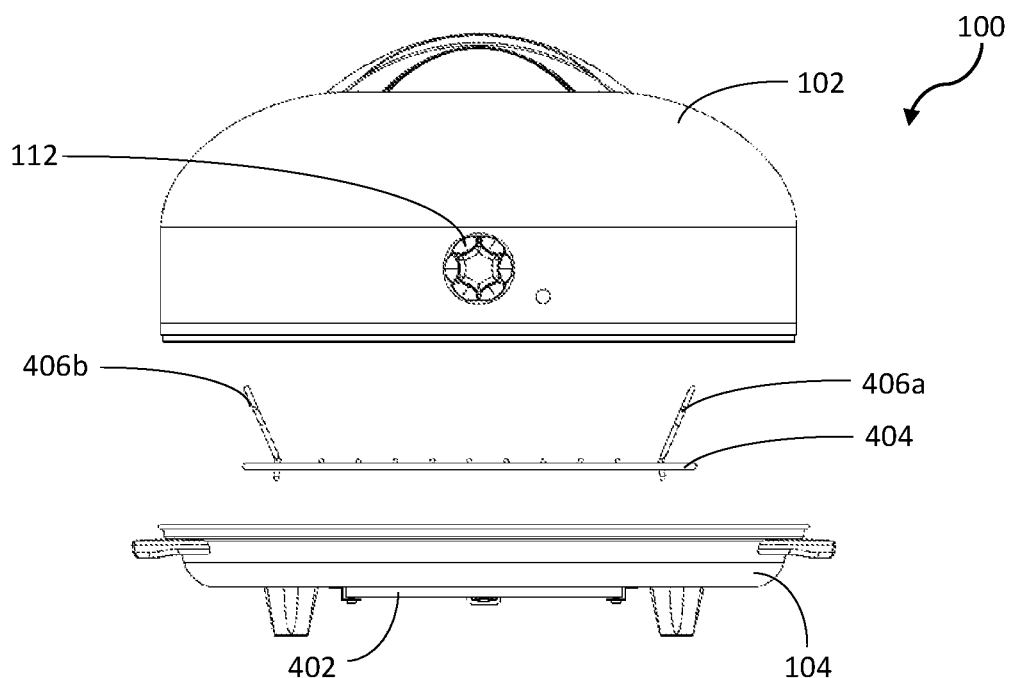
FIG. 4 shows a side view of the roasting oven, wherein a power cable is deployed, as disclosed herein and in accordance with various illustrative embodiments.

However, in various illustrative embodiments, the base pan 104 may include a heating element for heating pan drippings or trimmings collected within the base pan 104 during roasting. Alternatively, the base pan 104 may not include a bottom heating element, which may also be termed a "heating module." Referring now to FIG. 4, there is shown a front view of the roasting oven 100, in which a bottom heating element 402 is slidably installed on the bottom of the base pan 104. In this manner, the bottom heating module 402 is removable. A roasting oven 100 operator may, for example, activate (e.g., via a secondary temperature controlling component of the base pan 104) the bottom heating element 402 disposed within the base pan 104 to bring pan drippings (and/or other food products) to a simmer within the base pan 104. An operator of the roasting oven 100 may therefore, for example, prepare a gravy within the base pan 104.

As shown, the roasting oven 100 may include a rack 404 and a temperature controlling component 112. The rack 404 may be seated in the base pan 104, such that a food product placed on the rack 404 is elevated a slight distance above the bottom portion of the base pan 104. In various illustrative embodiments, the rack 404 may elevate the food product from between 0.5" above the bottom of the base pan 104 to 3.0" above the bottom of the base pan 104. The temperature controlling component 112 may be variously disposed within and/or about the roasting oven 100, such as, for example, within the dome lid 102.

In various illustrative embodiments, the temperature controlling component 112 may include any suitable temperature input and control device, such as, for example, a temperature, brownness, or doneness selector, a thermostat, and/or a thermocouple. A thermocouple may alternatively be referred to as a bimetal temperature sensing device. A thermostat is an electromechanical component that senses the temperature within the heating chamber of the roasting oven, so that the internal temperature within the roasting oven 100 is maintained at or near a desired set point. The thermostat does this by switching heating or cooling devices on or off. A thermocouple is an electrical device consisting of two different conductors forming electrical junctions at differing temperatures. A thermocouple produces a temperature-dependent voltage as a result of the thermoelectric effect, and this voltage may be interpreted to measure the internal temperature within the roasting oven 100.

An operator of the roasting oven 100 may therefore set the temperature controlling component 112 to a desired temperature, a desired browning effect, a desired doneness (e.g., rare, medium rare, medium, well done, etc.), and the like. Having set the temperature controlling component 112, the temperature controlling component 112 may regulate (e.g., via the thermostat or thermocouple of the temperature controlling component 112) the temperature within the roasting oven 100, as described in greater detail below.

Moreover, in various illustrative embodiments, the rack 404 may include a plurality of lifting handles, such as lifting handles 406a and 406b. The lifting handles 406a and 406b may be grasped by a roasting oven 100 operator to lift and/or lower a food product placed on the rack 404 out of and/or into the base pan 104, respectively. Thus, a heavy food product, such as a turkey, may be safely and easily removed form and/or inserted into the base pan 104.

Figure 5:
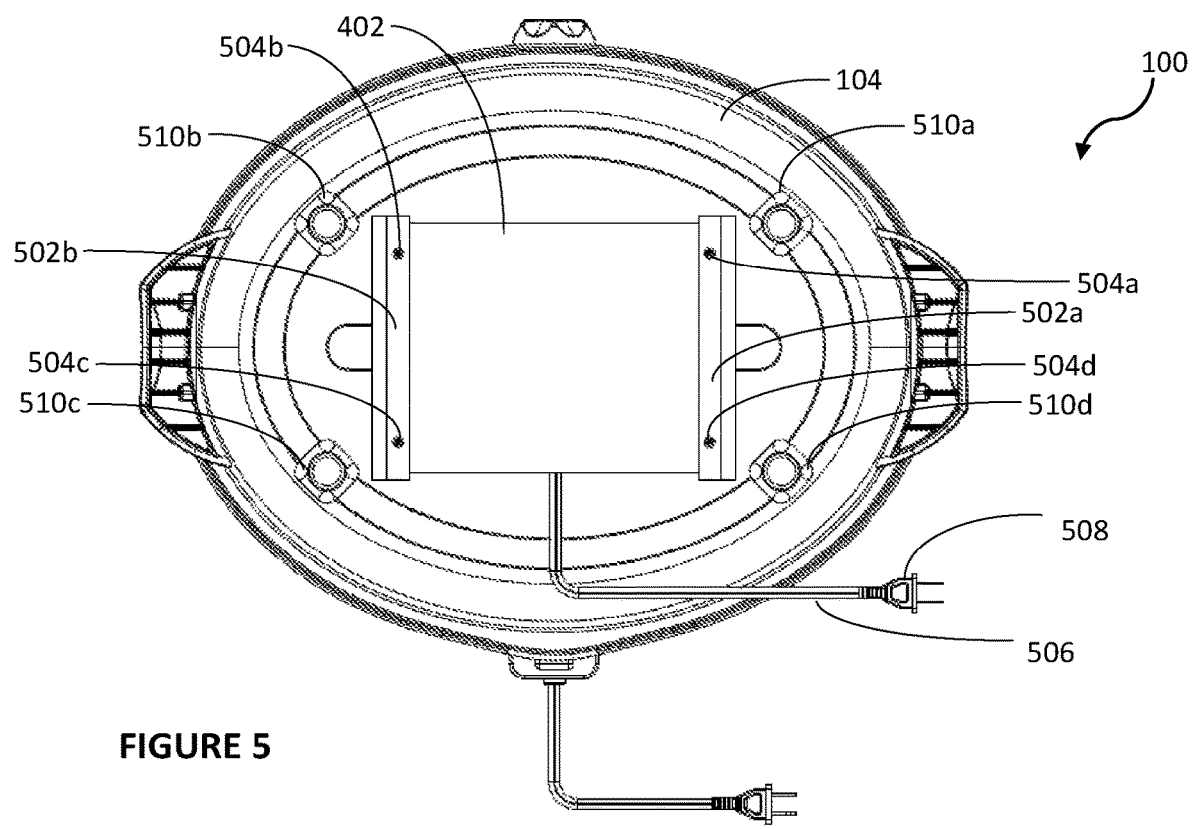
FIG. 5 shows a bottom view of the roasting oven as disclosed herein and in accordance with various illustrative embodiments.

Referring now to FIG. 5, a bottom view of the roasting oven 100 is shown. In various illustrative embodiments, the base pan 104 includes slots or rails 502a and 502b, into which the bottom heating element 402 may be mounted. Thereby, the bottom heating element 402 slides into the slots 502a and 502b. In various embodiments, the slots 502a and 502b are affixed to the bottom of the base pan 104 with welding spots. The bottom heating element 402 may be fixedly coupled to the base pan 104 and/or the slots 502a and 502b with fasteners 504a, 504b, 504c, and 504d. The fasteners 504a, 504b, 504c, and 504d may be screws, pins, snaps, or other similar removable and reusable fastener. A second power cable 506 may extend from the bottom heating element 402. The second power cable 506 may terminate in a plug connector 508, which may be electrically coupled to a standard AC power outlet (e.g., a 120-volt power outlet in North America). The power cable 506 may supply power to the bottom heating element 402.

In various illustrative embodiments, the roasting oven 100 may include a plurality of feet, e.g., feet 510a, 510b, 510c, and/or 510d. The feet 510a, 510b, 510c, and/or 510d may raise the roasting oven 100 a small distance above a support surface (e.g., a kitchen counter), such that air is free to circulate under the roasting oven 100. The roasting oven 100 may therefore rest on a variety of support surfaces without the risk of burning or damaging those support surfaces.

Figure 6:
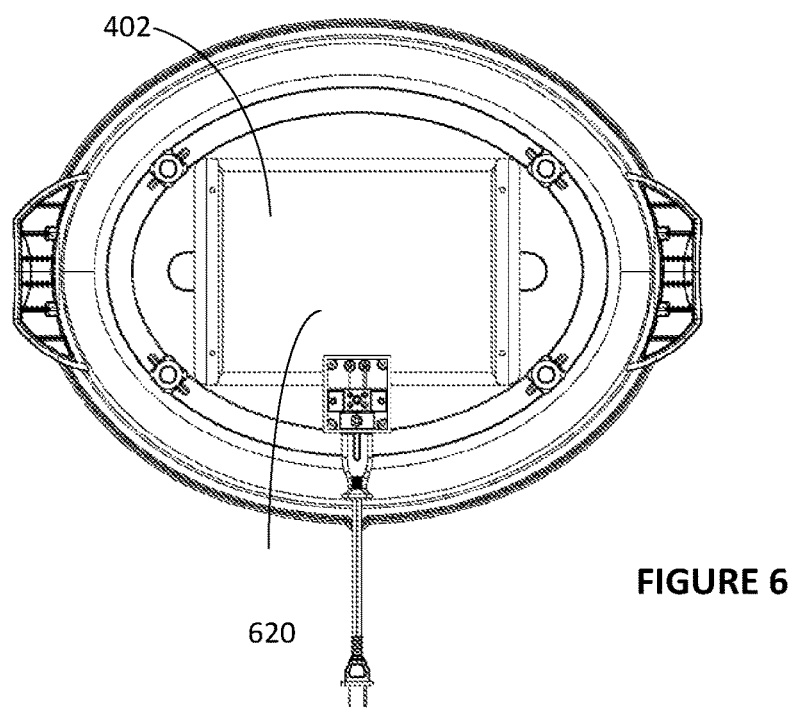
FIG. 6 shows a bottom view of the roasting oven and a detailed view of the flat bottom heating element, as disclosed herein and in accordance with various illustrative embodiments.
Figure 7:
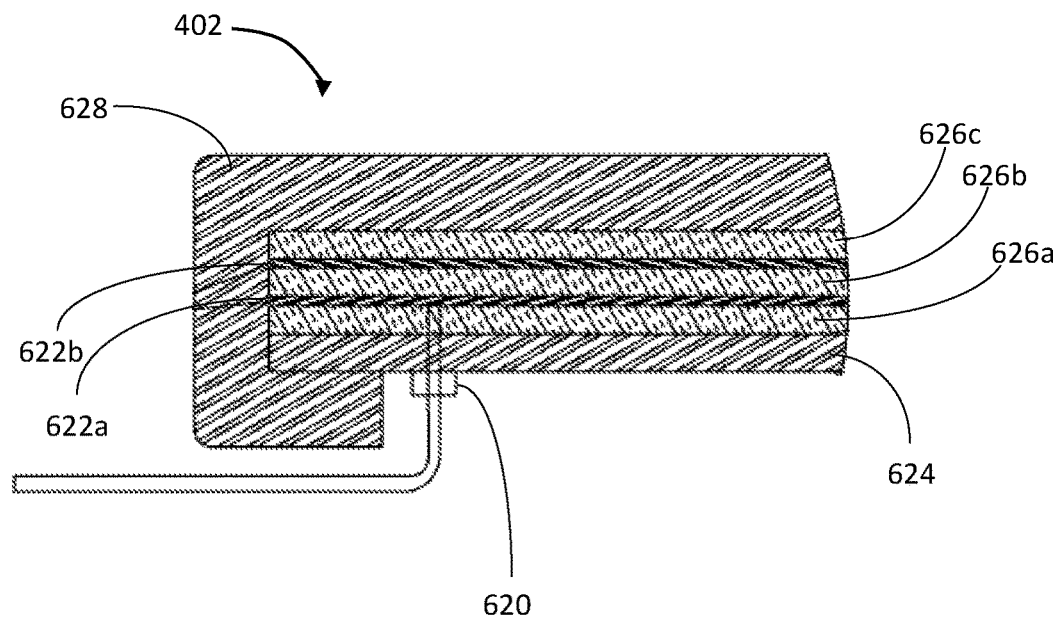
FIG. 7 shows a cross-section side view of the flat bottom heating element, as disclosed herein and in accordance with various illustrative embodiments.

Referring now to FIG. 6, there is shown the bottom heating element 402 and the power cable connector 620 in detail. Referring now to FIG. 7, there is shown a cross-section side view of the bottom heating element 402. In various illustrative embodiments, the power cable connect is operatively coupled to the heating components 622a and 622b of the bottom heating element 402. The bottom heating element 402 includes a metal plate 624, three mica sheets 626a, 626b, and 626c, and an aluminum top sheet 628. The mica sheets 626a, 626b, and 626c form a three-layer sandwich around the heating components 622a and 622b. In various illustrative embodiments, the metal plate 624 is stainless steel.

In various illustrative embodiments, the bottom heating element includes a three-layered sandwich mica heater assembly encased in stainless steel sheathing.

Figure 8:
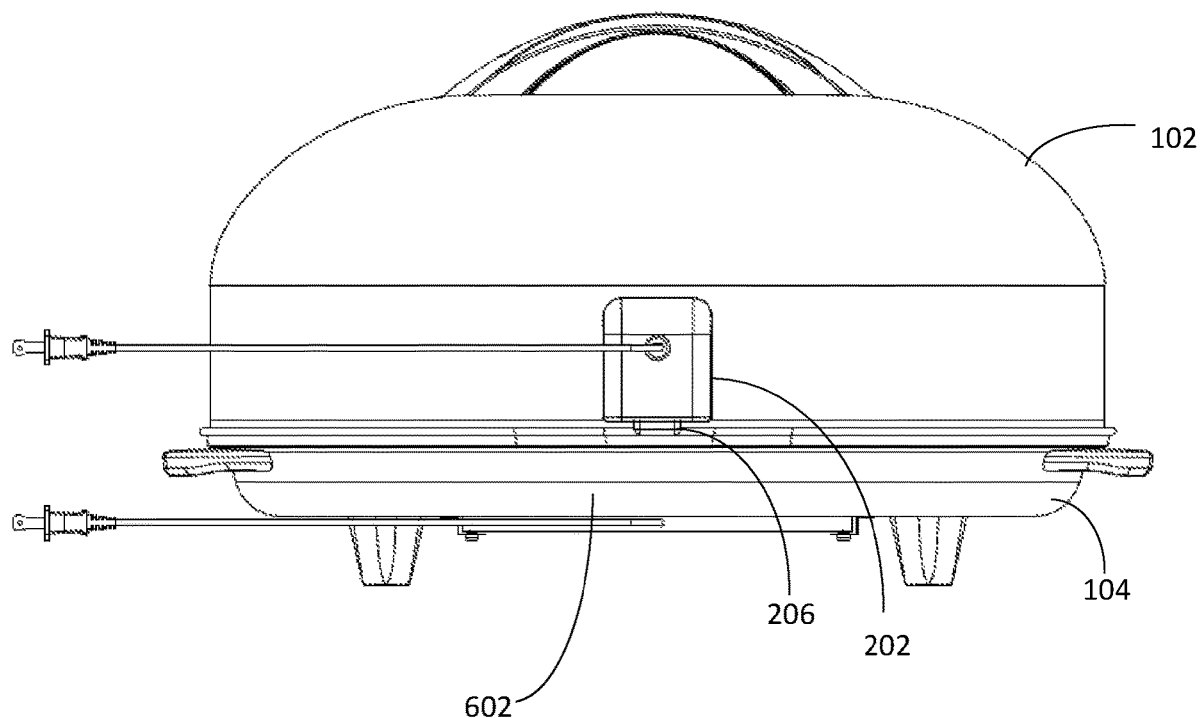
FIG. 8 shows a back view of the roasting oven as disclosed herein, wherein the safety switch engages with the rim of the base pan, in accordance with various illustrative embodiments.
Figure 9:
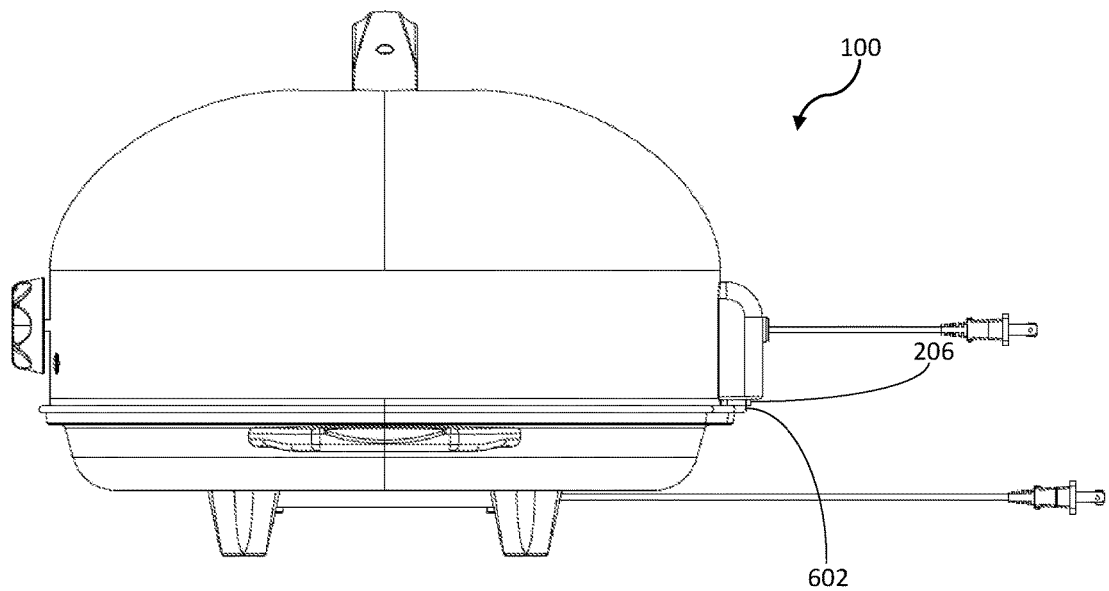
FIG. 9 shows a side view of the roasting oven as disclosed herein, wherein the safety engages with the rim of the base pan, the temperature controlling component accepts user temperature input, and side handles allow the operator move the roasting oven.

Referring now to FIG. 8, there is shown a rear-side view of an illustrative roasting oven 100 with the dome lid 102 placed upon the base pan 104. The piston 206 of the safety switch 202 engages with a base pan rim 602. As an operator places the dome lid 102 on the base pan 102, the base pan rim 602 depresses the piston 206 and the safety switch 202 allows power to flow to the dome lid heating belt. In various embodiments, the safety switch 202 turns off power that is being transferred to the heating element 1210 when the dome lid 102 is separated from the base pan 104. Referring now to FIG. 9, there is shown the illustrative roasting oven 100 from a side view, where the base pan rim 602 is depressing the piston 206 of the safety switch 202.

Figures 10A, 10B, 10C:
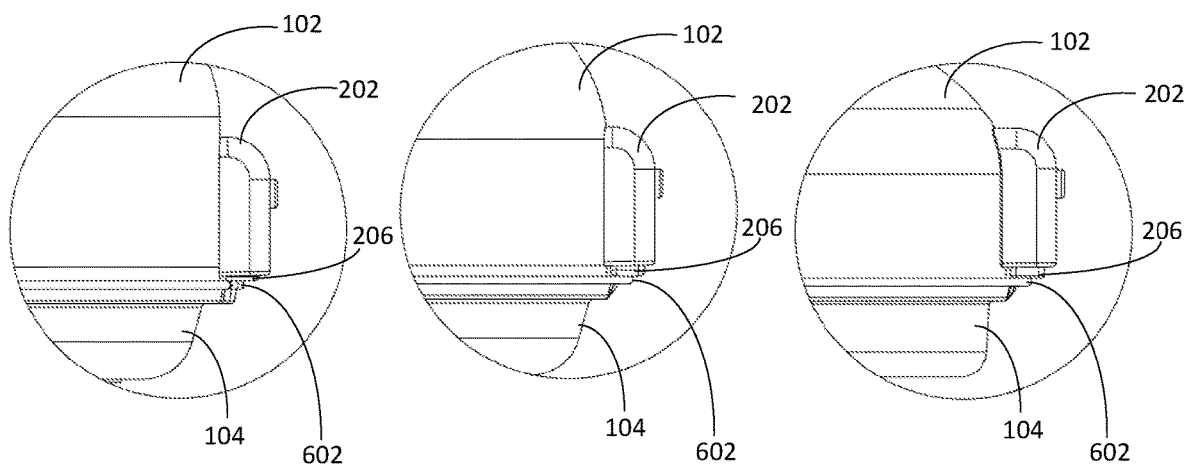
FIG. 10A shows a detailed side view of the safety switch engaging with the rim of the base pan for a Mini roasting oven.
FIG. 10B shows a detailed side view of the safety switch engaging with the rim of the base pan for a Junior roasting oven.
FIG. 10C shows a detailed side view of the safety switch engaging with the rim of the base pan for a Senior roasting oven.

Referring now to FIGS. 10A-C, there is shown the piston 206 of the safety switch 202 engaging with the base pan rim 602 in various stages of depression for three different embodiments of the roasting oven 100. Referring now to FIG. 10A, there is shown a roasting oven 100 illustrative embodiment termed the "Mini," which is the smallest of the embodiments described in FIGS. 10A-C. In FIG. 10A, the piston 206 contacts the base pan rim 602, but the dome lid 102 has not yet come to rest on the base pan 104. Thus, the piston 206 is not depressed by the base pan rim 602. Referring now to FIG. 10B, there is shown a roasting oven 100 illustrative embodiment termed the "Junior," which is an intermediate size of the embodiments described in FIGS. 10A-C. In FIG. 10B, the dome lid 102 has approached nearer to resting upon the base pan 104 and the base pan rim 602 has engaged the piston 206 and begun to depress the piston. However, the piston 206 is not fully depressed and is only partially depressed. Referring now to FIG. 10C, there is shown a roasting oven 100 embodiment termed the "Senior," which is the largest of the embodiments described in FIGS. 10A-C. In FIG. 10C, the dome lid 102 has come to fully rest upon the base pan 104 and the base pan rim 602 has fully depressed the piston 206 causing the safety switch 202 to allow power to flow to the heater belt disposed within the dome lid 102.

In the illustrative embodiments, the Mini and Junior base pan has a rim flange, in which the pour port is recessed in the flange. The Senior embodiment has a Senior base pan that includes a rim without a flange and a protruding pour port. When the heavy dome lid rim rests on the shoulder of the pan, the piston of the safety switch will set on the flange associated with both the Mini and Junior and have some degree of depression that causes the heater belt to be energized. With respect to the Senior embodiment, the rim of the lid will set on the protruding pour port to achieve piston depression and cause the heater belt to be energized. Note, the degree of depression is similar for the Senior, Mini and Junior. However, the senior unit requires more careful alignment between the safety switch piston and the pour port.

Figure 11:
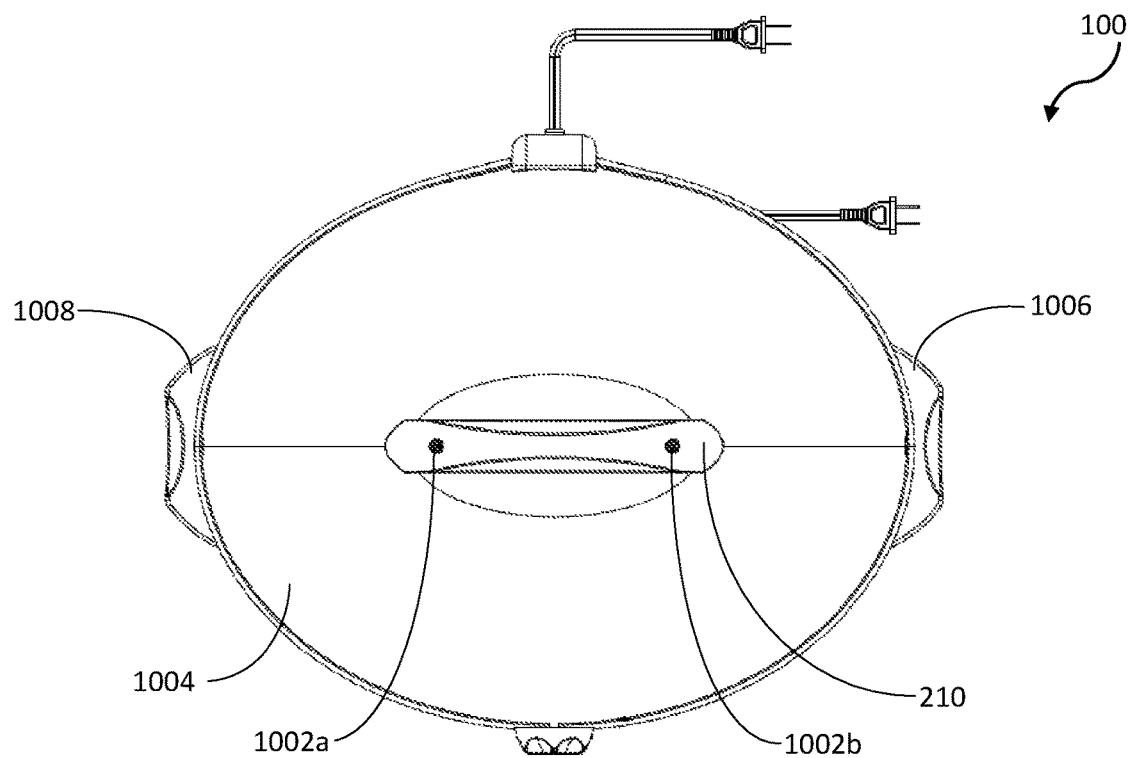
FIG. 11 shows a top view of the roasting oven, as disclosed herein and in accordance with various illustrative embodiments.

Referring now to FIG. 11, there is shown a top view of the illustrative roasting oven 100. As described above, the roasting oven 100 may include the dome lid 102 and the lid handle 210. The roasting oven 100 may further include a plurality of side handles 1006 and 1008, which may be coupled to the base pan 104 and/or the dome lid 102 for lifting and/or moving all or a portion of the roasting oven 100. In various illustrative embodiments, the lid handle 210 is mounted on the top of the dome lid 102. Fasteners 1002a and 1002b pass through the lid handle 210 and a dome lid outer wall 1004 to fasten the lid handle to the dome lid 102.

Figure 12:
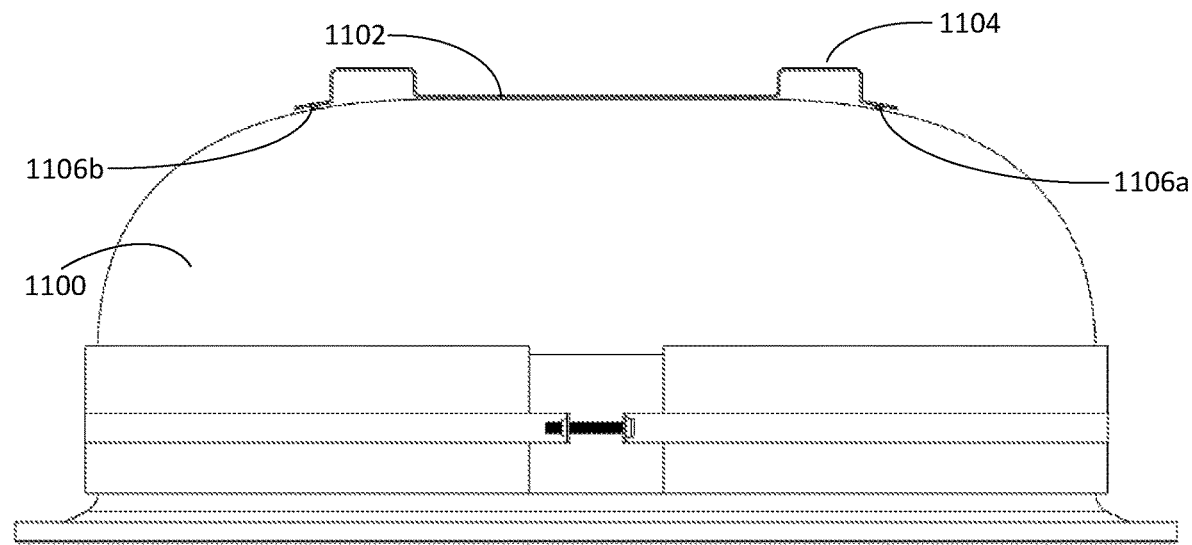
FIG. 12 shows the dome lid inner wall and mounting bar as disclosed herein and in accordance with various illustrative embodiments.

Referring now to FIG. 12, there is shown a dome lid inner wall 1100. A mounting bar 1102 is attached to the inner wall 1100. The mounting bar 1102 is attached such that the inner wall 1100 is not punctured or breached, for example, by a screw, bolt, or other fastener. In various illustrative embodiments, the mounting bar 1102 is welded to the inner wall 1100 at attachment points 1106a and 1106b. The dome lid inner wall 1100 has an interior surface, which borders the cooking chamber. Additionally, the dome lid inner wall 1100 has an exterior surface that borders the interior space of the dome lid 102 formed by the dome lid inner wall 1100 and the dome lid outer wall 1004.

Figure 13:
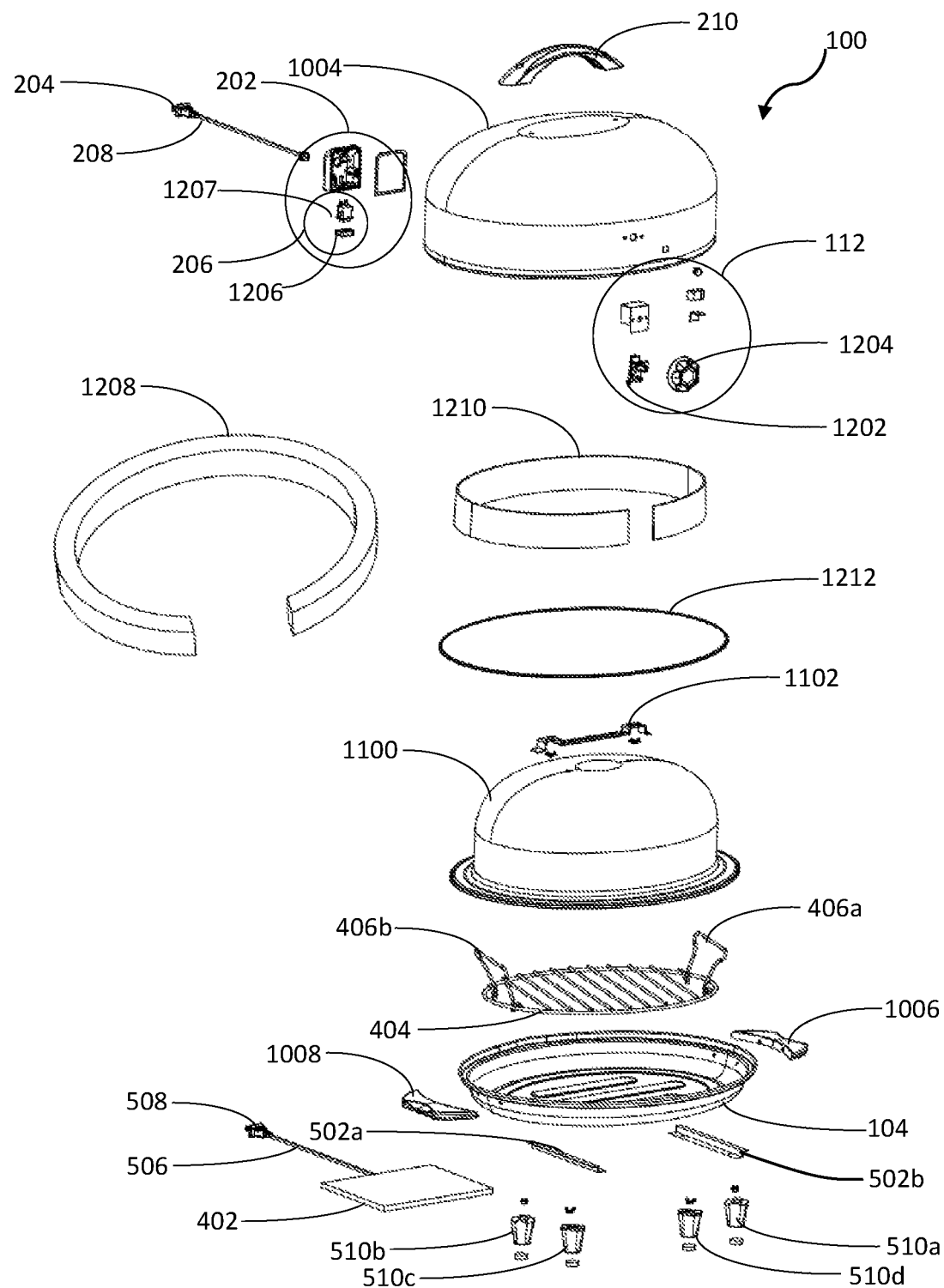
FIG. 13 shows an exploded view of the roasting oven as disclosed herein and in accordance with various illustrative embodiments.

FIG. 13 shows an exploded view of the roasting oven 100. From the top down, the roasting oven 100 may include the lid handle 210, the safety switch 202 (comprising the piston 206, which is formed from the combination of a piston cover 1206 and a piston component 1207), the power cable 204 and plug connector 208, a dome lid outer wall 1004, the temperature controlling component 112 (including a temperature control 1202 and a temperature control knob 1204, in other embodiments the temperature controlling component 112 includes a digital or LED readout (not shown) and a selector or button (not shown)), an insulating material 1208, a heating element (also termed "heating belt") 1210, a gasket 1212, a mounting bar 1102 (also termed "mounting bracket"), a dome lid inner wall 1100, the rack 404 (including the lifting handles 406a and 406b), the base pan 104, the side handles 1006 and 1008, rails 502a and 502b, the bottom heating element 402, the second power cable 506 terminating in the second plug connector 508, and the feet 510a, 510b, 510c, and 510d. As described herein, the temperature control 1202 may include a thermostat or thermocouple. An operator of the roasting oven 100 may adjust the temperature (or other cooking setting, such as brownness or doneness) using the temperature control knob 1204.

In addition, as shown, the heating element 1210 may generally extend within the dome lid 102 from a first edge of the dome lid 102 to a second edge of the dome lid 102, such that the heating element 1210 extends along an entire (or substantially an entire) perimeter of the dome lid 102. The heating element 1210 is therefore, in various illustrative embodiments, radially disposed about all or a portion of the dome lid 102. However, in various illustrative embodiments, the heating element 1210 may extend within any portion of the dome lid 102 that is less than the entire perimeter of the dome lid 102. Moreover, as shown, the heating element 1210 may extend within the dome lid 102 (i.e., between an exterior surface of the dome lid inner wall 1010 and an interior surface of the dome lid outer wall 1004) as a "belt" or "heating belt" that extends radially within the dome lid 102 and to a predetermined elevation or height above the base of the dome lid 102. In other words, the heating element 1210 may include a belt or strip disposed within the dome lid 102 between the dome lid inner wall 1010 and the dome lid outer wall 1004. The heating element 1210 may further extend from a base of the dome lid 102 to a predetermined height above the base of the dome lid 102, such that the heating element is not disposed in a top portion of the dome lid 102.

As a result of the location of the heating element 1210 within the dome lid 102, the roasting oven 100 may apply indirect heat to the food product (including a top surface of the food product), so that the food product is uniformly browned, but not scorched by the heating element 1210. The heat energy generated by the heating element 1210 may, rather, be evenly (or substantially evenly) dispersed between the dome lid outer wall 1004 and the dome lid inner wall 1010. Therefore, as the heat generated by the heating element 1210 is contained and circulated within the dome lid 102, the heat may radiate more uniformly and with less intensity toward the food product, resulting in a uniformly browned, but not scorched, food product.

The heating element 1210 may include any suitable heating element, such as, for example, an electric heating element. An electric heating element may include a metallic structure having a resistance to electric current that generates heat energy when the electric current is passed through the electric heating element. The heating element 1210 is electrically coupled to the temperature controlling component 112 by a power cable 202. The electric current may be supplied by the power cable 202, which may draw electric current from an electrical wall outlet as described above.

Moreover, although the heating element 1210 may be situated radially as a "belt" within the dome lid 102, the dome lid 102 may store substantial heat energy. Thus, as heat rises away from the heating element 1210, much of the heat may be trapped internally within the structure of the dome lid 102 itself. As a result, the dome lid 102 may radiate stored heat energy by way of a convective (air circulating) process towards the top and over outer surfaces of the enclosed food product. The food product may therefore brown uniformly within the roasting oven 100, notwithstanding the absence of a heating element directly overtop the food product.

Further, the bottom heating element 402 is slidably installed on the bottom of the base pan 104 using the rails 502a and 502b and fixedly coupled to the base pan 104. The bottom heating element 402 is flat and removable from the rails 502a and 502b. In various illustrative embodiments, the bottom heating element includes a three-layered sandwich mica heater assembly encased in stainless steel sheathing. The bottom heating element 402 may be inserted or removed from the holding slots or rails 502a and 502b to provide auxiliary heating to the roasting oven 100 as need. Additionally, the bottom heating element 402 may be used to cook and/or brown side dishes, such as potatoes and/or gravy.

Figure 14:
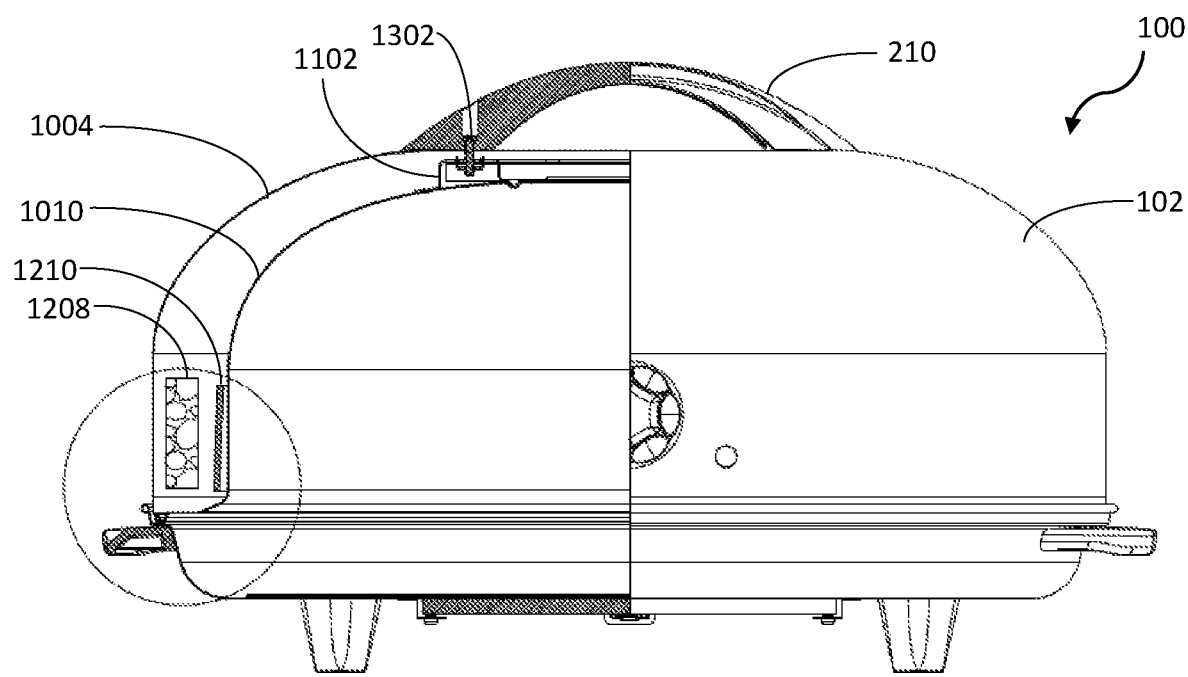
FIG. 14 shows a partial cross-section of an embodiment of the roasting oven, wherein the dome lid inner wall and the dome lid outer wall form a rim with a water tight seal, an insulating material is disposed between the dome lid outer wall, and the heating element, as disclosed herein and in accordance with various illustrative embodiments.

Referring now to FIG. 14, there is shown a partial cross-section of a roasting oven 100 embodiment, in which the dome lid 102 is assembled with the lid handle 210 using a fastening screw 1302. The screw 1302 passes through a hole in the lid handle 210 to interface with the mounting bar 1102. The lid handle 210 is fastened to the surface of the dome lid outer wall 1004 such that the lid handle 210, dome lid 102, and mounting bar 1102 form an integral dome lid assembly.

Additionally, the insulating material 1208 is disposed within the dome lid 102. More particularly, as shown, the portion of the heating element 1210 that faces the dome lid outer wall 1004 may be separated from the dome lid outer wall 1004 by the insulating material 1208, while the portion of the heating element 1210 that faces the dome lid inner wall 1010 may do so without an intervening layer of insulating material. Thus, some of the heat generated by the heating element 1210 may be allowed to escape through the dome lid inner wall 1010. This may help to dissipate some of the heat generated by the heating element 1210 into the heating chamber of the roasting oven 100.

The heating element 1210 may also include a heating belt. By way of example and not of limitation, the roasting oven 100 may include the insulating material 1208, which may be radially disposed about the heating element 1210 and positioned within the dome lid outer wall 1004, such that a top or upper portion of the dome lid 102 does not include the insulating material 1208. Moreover, as described herein, the heating element 1210 as well as the insulating material 1208 may extend substantially radially within the dome lid 102. In other words, the heating element 1210 and insulating material 1208 may extend about a perimeter (or substantially about a perimeter) of the dome lid 102 and within the dome lid 102 between the dome lid inner wall 1010 and the dome lid outer wall 1004. The heating element 1210 and/or insulating material 1208 may further extend from a base of the dome lid 102 to a predetermined height above the base of the dome lid 102.

In another illustrative heating belt embodiment, the insulating material 1208 may extend from the base to the top of the dome lid 102. Thus, the insulating material 1208 is disposed between the dome lid inner wall 1010 and the dome lid outer wall 1004. Also, the heating element 1210 is separated from contact with the dome lid outer wall 1004 by the insulating material 1208.

Figure 15:
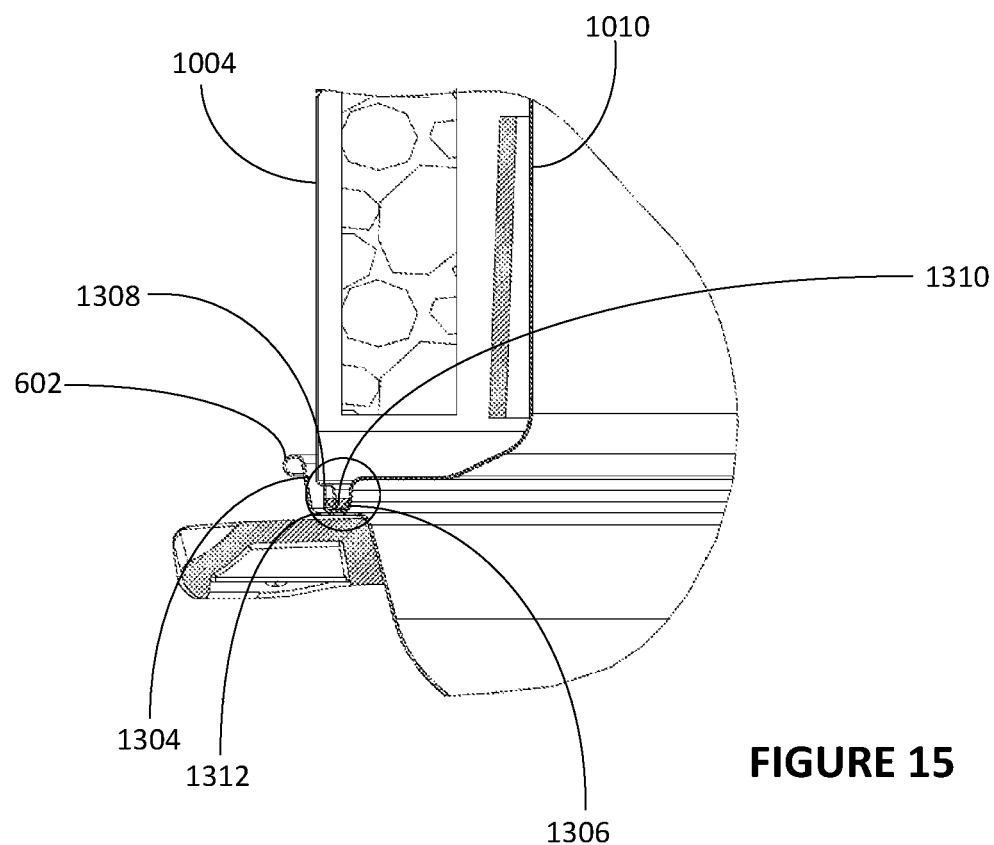
FIG. 15 shows a cutout view of the inner wall and outer wall of the dome lid as disclosed herein and in accordance with various illustrative embodiments.

FIG. 15 shows a cutout view of the dome lid inner wall 1010 and the dome lid outer wall 1004. As shown, the dome lid inner wall 1010 and the dome lid outer wall 1004 may be joined at a rim 1304 of the dome lid 102 with a specially formed inner wall rim 1306 and a specially formed outer wall rim 1308. The inner wall rim 1306 and outer wall rim 1308 interlock to form a watertight seal. In various illustrative embodiments, the dome lid inner wall 1010 may be joined at a rim 1304 with the inner wall rim 1306, the outer wall rim 1308, and a gasket 1310. The gasket 1310 resides within the inner wall rim 1306 so that the outer wall rim 1308 and the inner wall rim 1306 each contact the gasket 1310. In other embodiments, the outer wall rim 1308 interlocks with the inner wall rim 1306 and interfaces with the gasket 1310. The gasket 1310 may be a specially designed half-round silicone gasket. In other embodiments, the inner wall rim 1306 receives the outer wall rim 1308, and generates a seal when the outer wall rim 1308 interlocks with the inner wall rim 1306. The rim 1304 of the dome lid 102 rests upon a shoulder 1312 of the base pan 104 and interfaces with the base pan rim 602 to cause a seal when the dome lid 102 is properly placed upon the base pan 104 in order to cook an illustrative turkey or other food product. The shoulder 1312 is lower than the base pan rim 602, which allows the dome lid 102 to sit low enough into the base pan 104 to engage the piston 206 of the safety switch 202 with the base pan rim 602 and fully depress the piston 206. This configuration allows the dome lid 102 to rest above the bottom interior surface of the base pan 104. Such a configuration is beneficial because food product or drippings from a food product may be on the bottom interior surface of the base pan 104, and it is undesirable to have the dome lid rim 1304 contacting the food product because this may contaminate the food product and require more and more vigorous cleaning of the dome lid 102.

Figure 16:
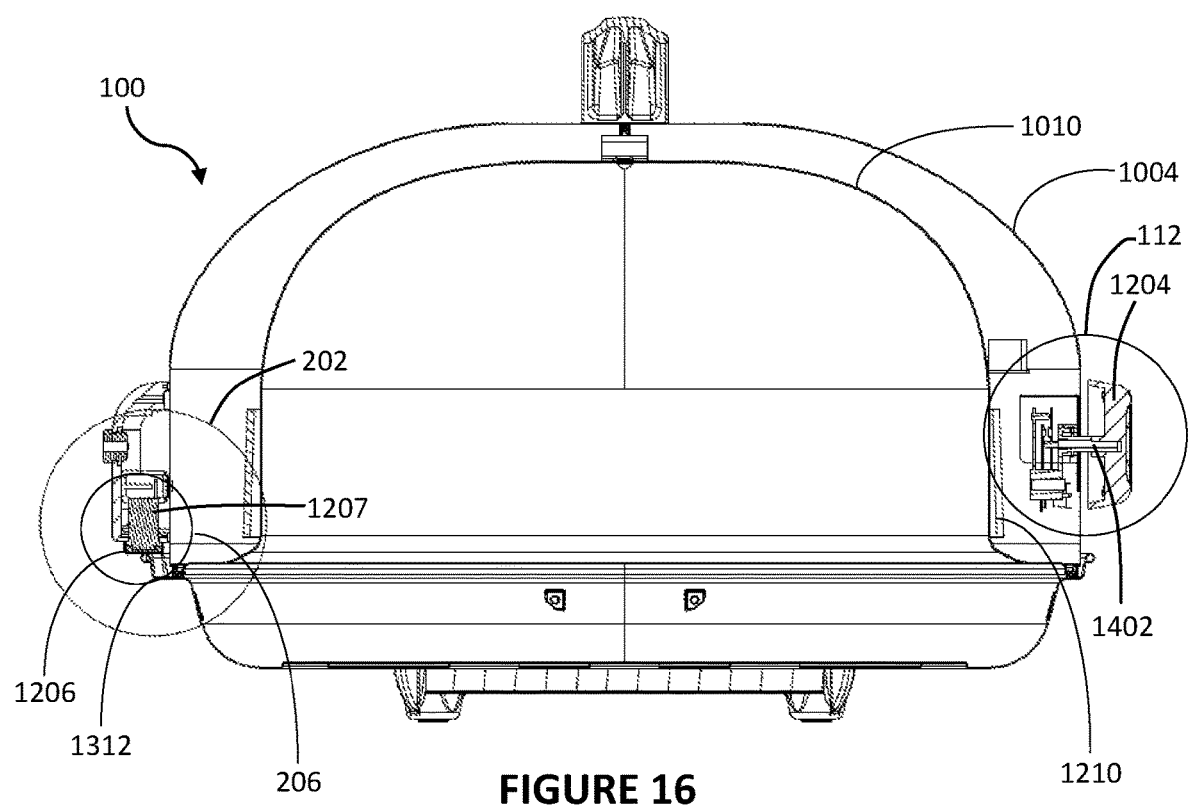
FIG. 16 shows a cross section side view of a Senior roasting oven including the temperature controlling component and the safety switch.
Figure 17:
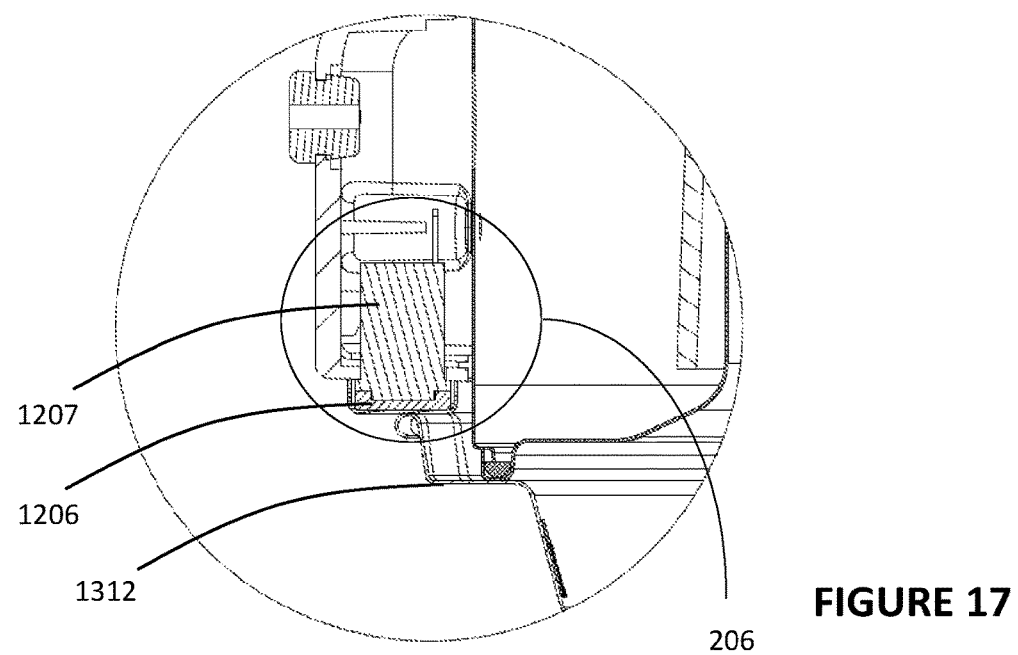
FIG. 17 shows a detailed cross section side view of the safety switch mounted on the dome lid, and the rim and shoulder of the base pan.

Referring now to FIG. 16, there is shown a cross-sectional side view of the roasting oven 100 that includes cross-sections of the temperature controlling component 112 and the safety switch 202. The base pan rim 602 contacts the piston 206 at the piston cover 1206. The dome lid 102 is shown in a closed or operational position, resting upon the base pan shoulder 1312. In this position, the base pan rim 602 engages and fully depresses the piston 206, causing the piston component 1207 to complete a power circuit and allow power to flow to the dome lid heating belt 1210. The temperature controlling component 112 is mounted on the interior wall of the dome lid outer wall 1004. A control shaft protrudes through the dome lid outer wall 1004 to operatively couple with the temperature control knob 1204. A bi-metal strip of the temperature control 1202 is positioned adjacent to the exterior surface of the dome lid inner wall 1010. The bi-metal strip senses the temperature of the roasting oven 100. In response to the sensed temperature and the temperature input by an operator at the temperature control knob 1204, the bi-metal strip opens contact points in the temperature control 1202 to cut off power to the heater belt 1210 or to close contact points and turn on power to the heater belt 1210, in order to maintain the temperature input set by an operator. Referring now to FIG. 17, there is shown a detailed cross-section view of the safety switch 202.

Figure 18:
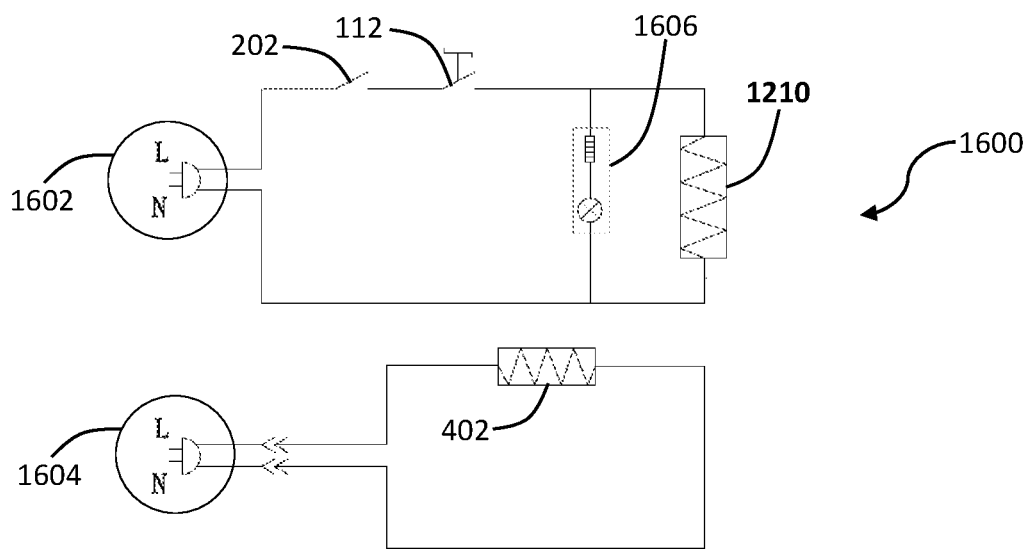
FIG. 18 shows an electrical circuit diagram of the roasting oven as disclosed herein and in accordance with various illustrative embodiments.

With reference to FIG. 18, an electrical circuit diagram 1600 of the roasting oven 100 is shown. In various illustrative embodiments, the roasting oven 100 may include a power supply 1602, the safety switch 202, the temperature controlling component 112, an indicator light 1606, and/or the heating belt 1210. The power supply 1602 may be coupled, as described herein, to a wall outlet by way of the power cable 202. The power supply 1602 may supply power through the safety switch 202 to the temperature controlling component 112, the indicator light 1306, and the heating belt 1210. In various illustrative embodiments, and during operation, an operator of the roasting oven 100 may adjust the temperature controlling component 112 (e.g., by way of the temperature control knob 1204) to adjust the operating temperature of the roasting oven 100. The indicator light 1306 may be illuminated in response to a cooking input, during operation, during a preheating stage, and the like. The heating belt 1210 may supply heat to the roasting oven 100 based upon the cooking input and in response to a temperature detected or measured by a thermostat or thermocouple of the temperature controlling component 112. More particularly, the temperature controlling component 112 may include, in various illustrative embodiments a rheostat or potentiometer, which may be adjusted in response to a cooking input corresponding to a position of the temperature control knob 1204. As the cooking input is increased or decreased, the power supplied to the heating belt 1210 may be adjusted by the temperature controlling component 112, so that the heating belt 1210 generates more or less heat. The power supplied to the heating belt 1210 may further be adjusted (e.g., increased or decreased) based upon a temperature measurement.

In various illustrative embodiments, the roasting oven 100 may include a second power supply 1604 and a flat bottom heating element 402. During operation, an operator of the roasting oven 100 may provide auxiliary heating by connecting the bottom heating element 402 to the second power supply. An operator may also use the bottom heating element 402 to cook with only the base pan 104, such as when preparing gravy from the drippings of a turkey prepared in the roasting oven 100.

Figures 19A, 19B, 19C:
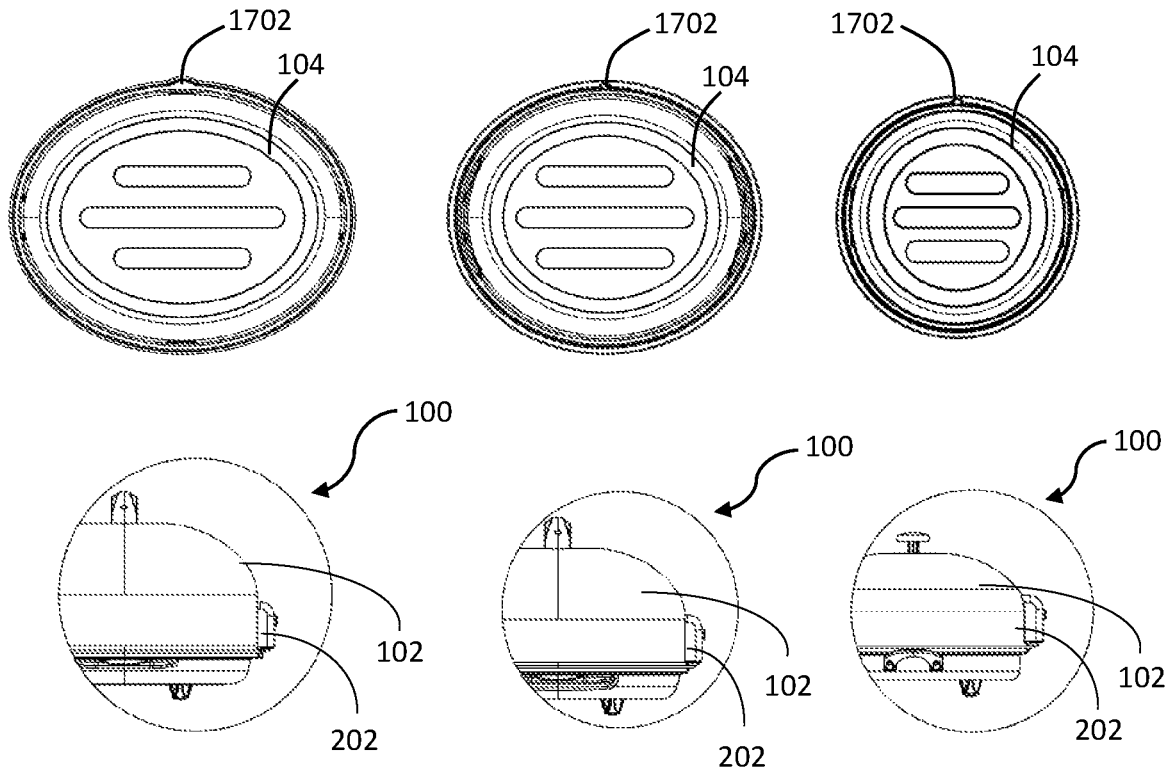
FIG. 19A shows a side view of the Senior roasting oven having a safety switch and the oval base pan with a drip spout.
FIG. 19B shows a side view of the Junior roasting oven having a safety switch and the oval base pan with a drip spout.
FIG. 19C shows a side view of the Mini roasting oven having a safety switch and the round base pan with a drip spout.

Referring now to FIGS. 19A-C, there is shown side views of the Senior, Junior, and Mini embodiments of the roasting oven 100 and the base pan 104 that corresponds to each of the embodiments. In each of the embodiments, the base pan 104 includes a drip spout 1702. The drip spout 1702 allows an operator to pour drippings or prepared gravy out of the base pan 104 in a controlled stream to limit waste and mess.

In FIG. 19A, there is shown the base pan 104 and side view of the Senior roasting oven 100. The base pan 104 has an oval shape and thus the dome lid 102 may only rest upon the base pan in one of two orientations, with the temperature controlling component 112 in line with the drip spout 1702, or with the safety switch 202 in line with the drip spout 1702. To properly engage the piston 206 of the safety switch 202 and thereby provide power to the heating belt 1210 of the dome lid 102, the temperature controlling component 112 must align with the drip spout 1702. In various embodiments, the Senior roasting oven 100 has a base pan 104 with a rim, but without a flange. In FIG. 19B, there is shown the base pan 104 and side view of the Junior roasting oven 100. The base pan 104 has an oval shape and thus the dome lid 102 may only rest upon the base pan in one of two orientations, with the temperature controlling component 112 in line with the drip spout 1702, or with the safety switch 202 in line with the drip spout 1702. To properly engage the piston 206 of the safety switch 202 and thereby provide power to the heating belt 1210 of the dome lid 102, the temperature controlling component 112 must align with the drip spout 1702. In various embodiments, the Junior roasting oven 100 has a base pan 104 with a rim flange and a drip spout recessed in the flange. FIG. 19C, there is shown the base pan 104 and side view of the Mini roasting oven 100. The base pan 104 has a circular shape and thus the dome lid 102 may rest upon the base pan in any number of radial orientations, with the temperature controlling component 112 in line with the drip spout 1702, with the safety switch 202 in line with the drip spout 1702, or with neither the safety switch 202 or the temperature controlling component 112 aligned with the drip spout 1702. To properly engage the piston 206 of the safety switch 202 and thereby provide power to the heating belt 1210 of the dome lid 102, the safety switch must not align with the drip spout 1702. In various embodiments, the Mini roasting oven 100 has a base pan 104 with a rim flange and a drip spout recessed in the flange. The portion of the dome lid 102 that is substantially vertical and perpendicular to the base pan 104 is of a different height for each of the Senior, Junior, and Mini. In various embodiments, the base pan 104 may have a substantially oval shape, a substantially circular shape, a substantially square shape, or a substantially rectangular shape.

Figure 20:
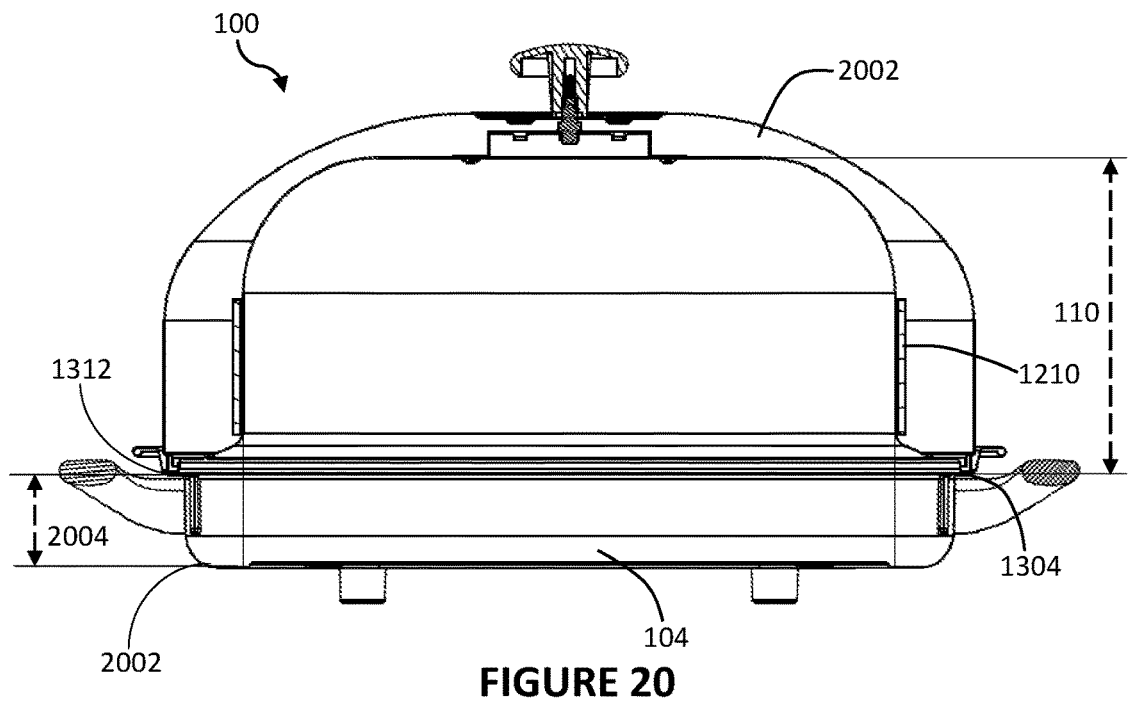
FIG. 20 shows cross-section front view of the Mini roasting oven having a dome lid height and a base pan height.
Figure 21:
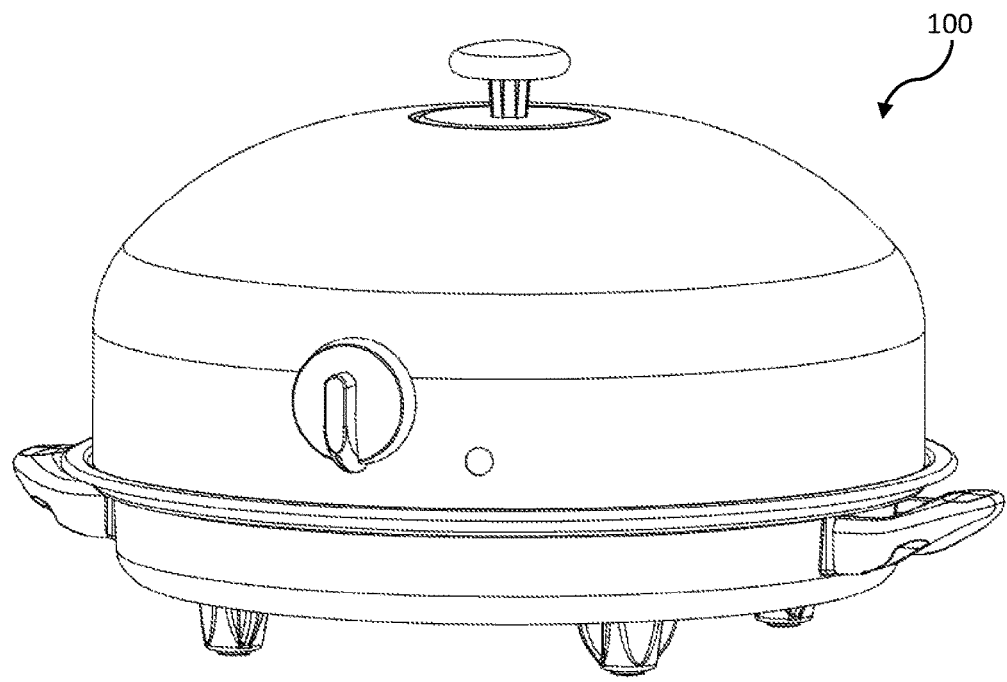
FIG. 21 shows a perspective view of the Mini roasting oven as disclosed herein and in accordance with various illustrative embodiments.

Referring now to FIG. 20, there is shown a cross-section view of the Mini roasting oven 100. The heating belt 1210 extends within the vertical portion of the dome lid 102 to approximately a height equal to half the dome lid height 110. In the Mini embodiment of the roasting oven 100, the dome lid height 110 is approximately 5.1" and measured from the top of the dome lid 102 interior to the dome lid rim 1304. Further, the base pan height 2004 is approximately 1.5" and measured from the shoulder 1312 to the bottom interior surface 2002 of the base pan 104. Thus, the ratio of the dome lid height 110 and the base pan height 2004 is greater than 2.5:1 and approximately 3.4:1. Referring now to FIG. 21, there is shown a front view of the Mini roasting oven 100.

Figure 22:
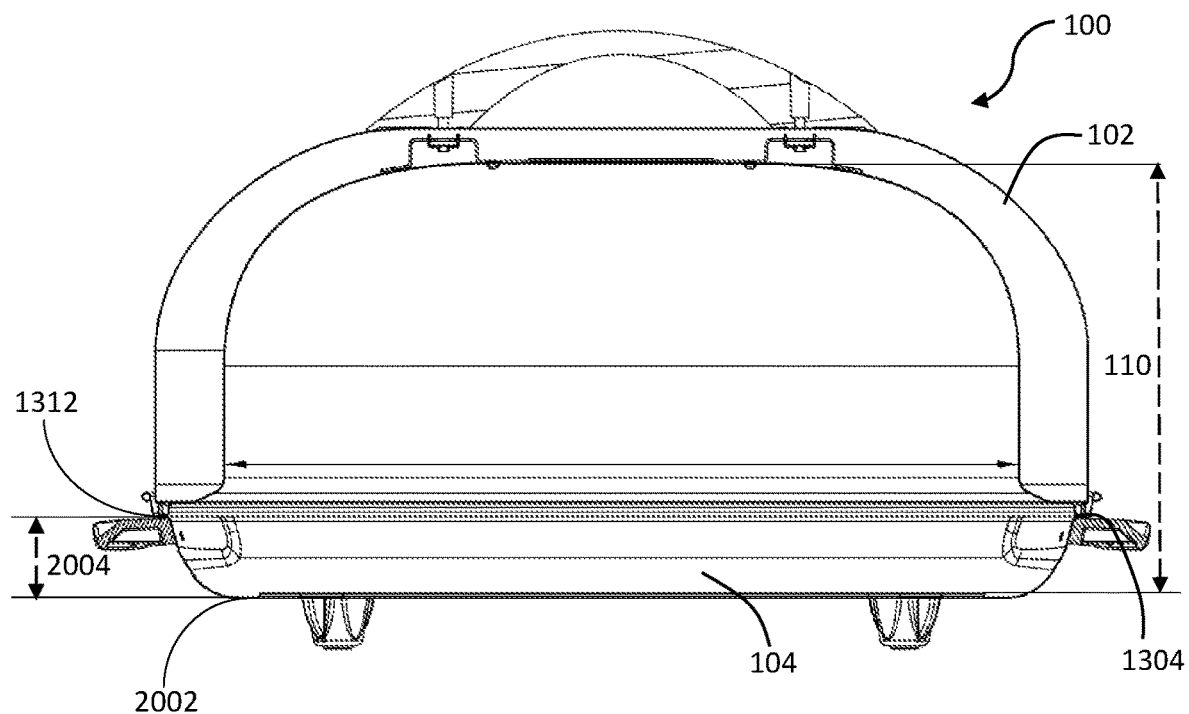
FIG. 22 shows cross-section front view of the Junior roasting oven having a dome lid height and a base pan height.
Figure 23:
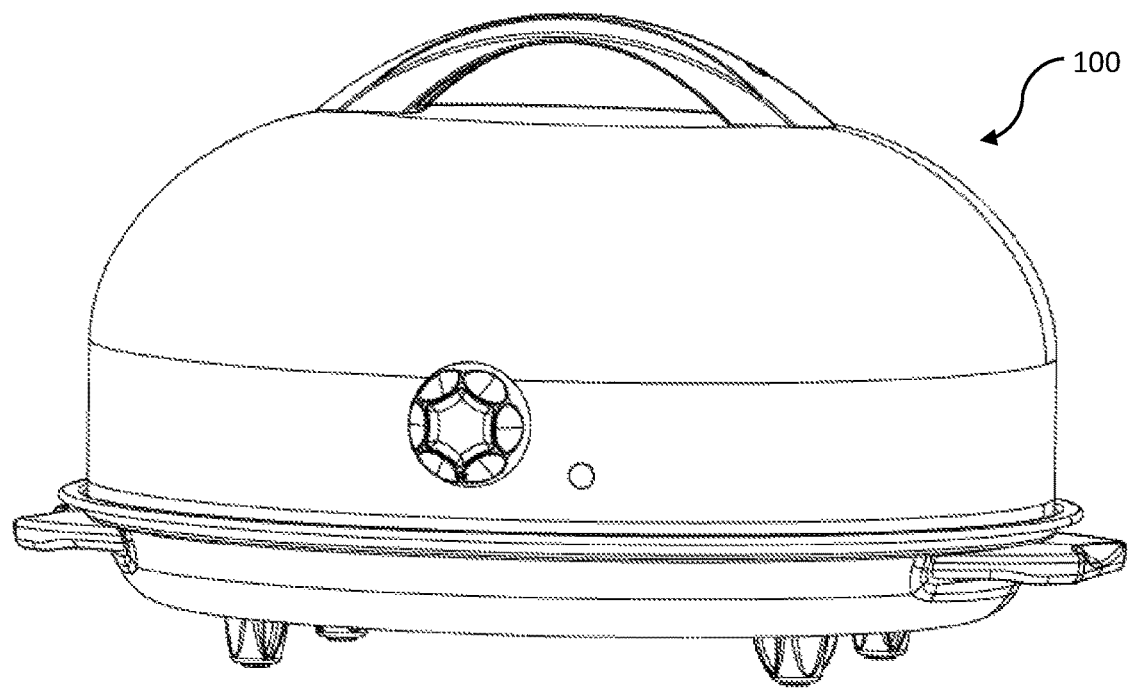
FIG. 23 shows a perspective view of the Junior roasting oven as disclosed herein and in accordance with various illustrative embodiments.

Referring now to FIG. 22, there is shown a cross-section view of the Junior roasting oven 100. The vertical portion of the dome lid 102 extends to a height approximately equal to half the height of the dome lid 102. In the Junior embodiment of the roasting oven 100, the dome lid height 110 is approximately 6.5" and measured from the top of the dome lid 102 interior to the dome lid rim 1304. Further, the base pan height 2004 is approximately 1.5" and measured from the shoulder 1312 to the bottom interior surface 2002 of the base pan 104. Thus, the ratio of the dome lid height 110 and the base pan height 2004 is greater than 2.5:1 and approximately 4.3:1. Referring now to FIG. 23, there is shown a front view of the Junior roasting oven 100.

In other illustrative embodiments, there may be a variety of dome lid height 110 and base pan height 2004 combinations having a ratio of 2.5:1 or greater. In one embodiment, the Senior roasting oven 100 may have a dome lid height of approximately 7.0" and a base pan height 2004 of approximately 1.5" that results in a ratio of greater than 2.5:1 and approximately 4.7:1.

Figure 24:
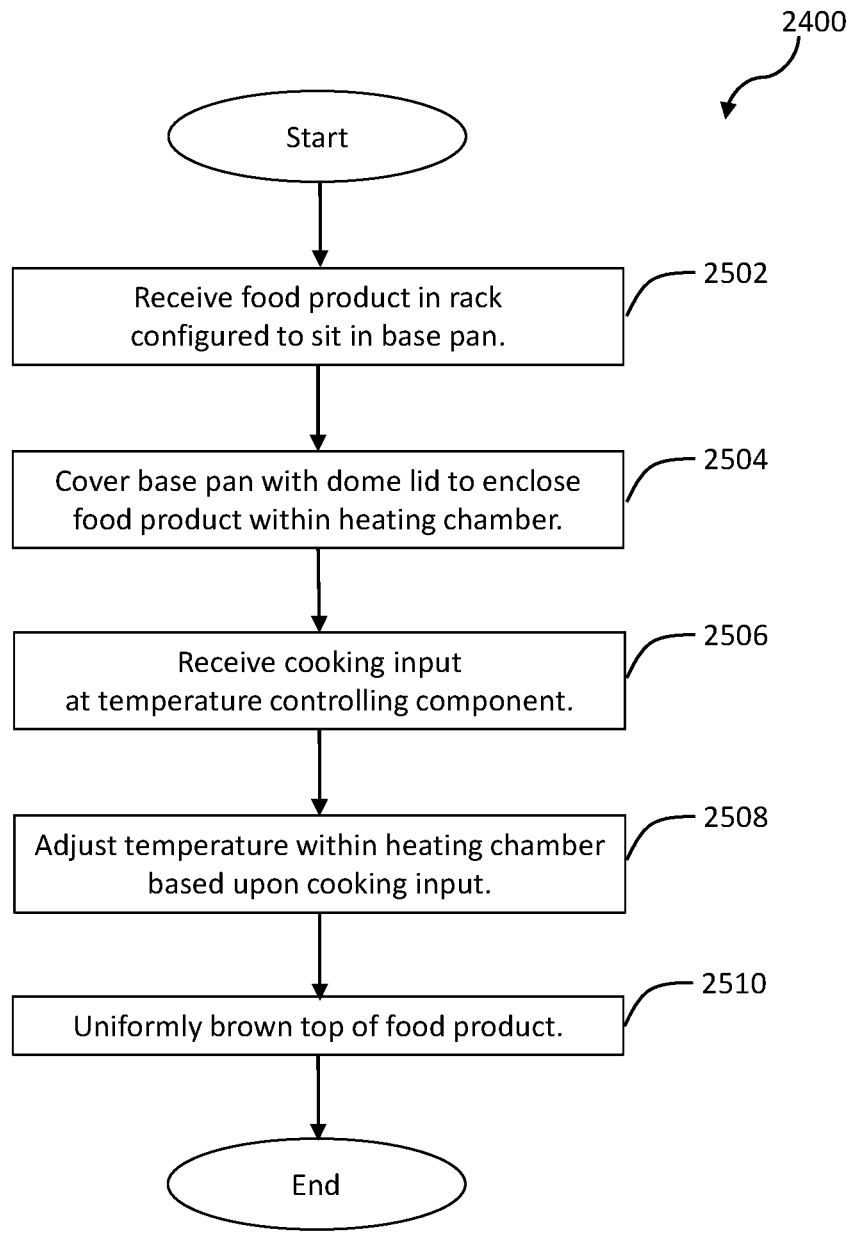
FIG. 24 shows a process for cooking a food product with a roasting oven as disclosed herein and in accordance with various illustrative embodiments.

Referring now to FIG. 24, a process 2400 for cooking a food product with a roasting oven 100 is shown. In various illustrative embodiments, the process 2400 may include receiving a food product in a tray or rack 402 that is configured to sit in the base pan 104 (step 2402). The base pan 104 may be covered by the dome lid 102, and the food product may be enclosed within the heating chamber defined between the base pan 104 and the dome lid 102 (step 2404). A cooking input (e.g., a cooking temperature, a desired doneness, a degree of browning, etc.) may be input and received by the temperature controlling component 112 (step 2406). The temperature controlling component 112 may be operatively coupled to the heating element 1210, and the temperature controlling component 112 may adjust the heat output by the heating element 1210 based upon the cooking input (step 2408). Thus, the roasting oven 100 may cook and/or brown a food product to a desired and/or selected temperature, doneness, degree of browning, etc. As described herein, the food product (e.g., the top of the food product) may further be uniformly browned by the roasting oven 100 (step 2410).

Figure 25:
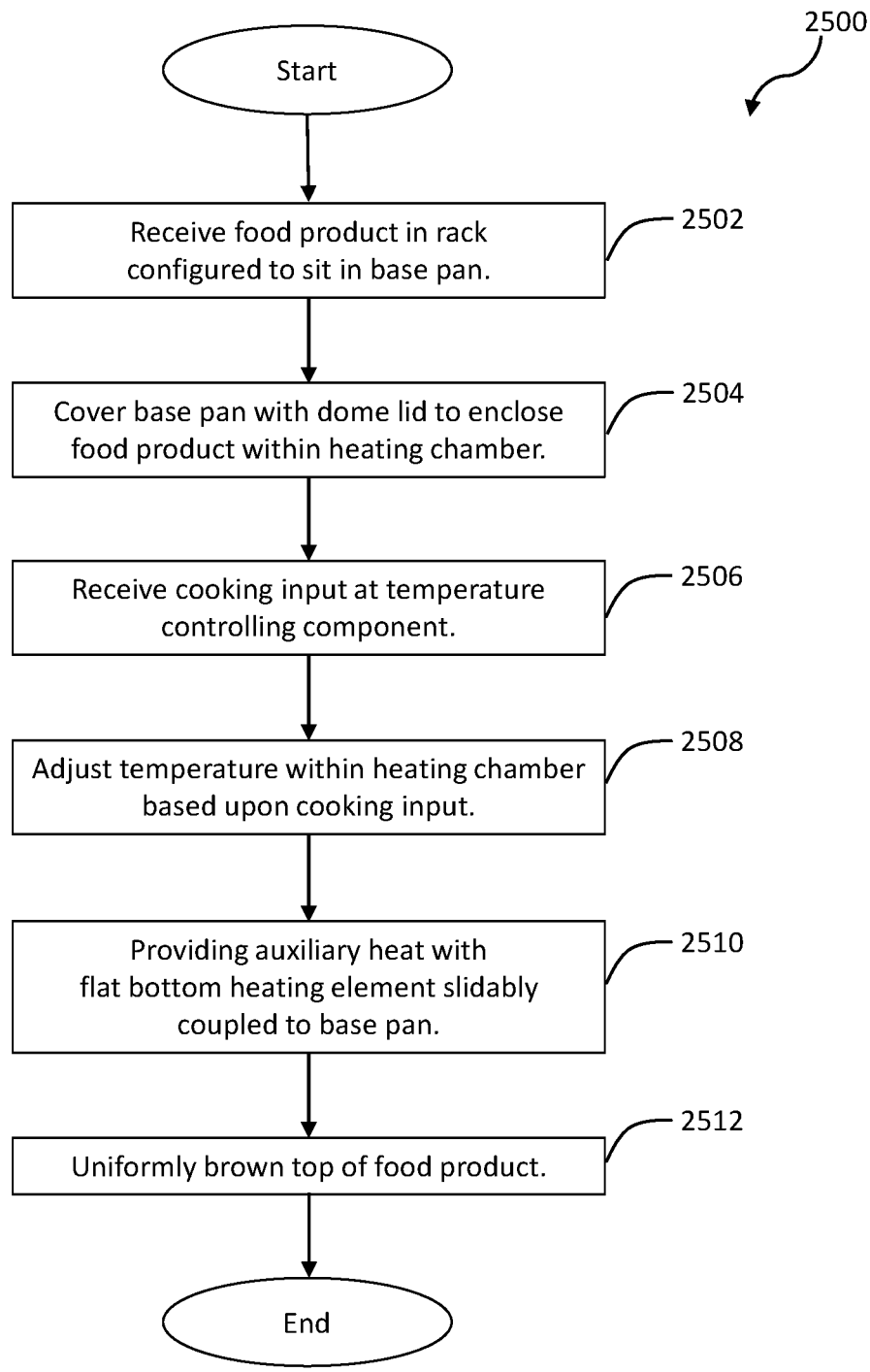
FIG. 25 shows a further process for cooking a food product with a roasting oven as disclosed herein and in accordance with various illustrative embodiments.

Referring now to FIG. 25, a process 2500 for cooking a food product with a roasting oven 100 is shown. In various illustrative embodiments, the process 2500 may include receiving a food product in a tray or rack 402 that is configured to sit in the base pan 104 (step 2502). The base pan 104 may be covered by the dome lid 102, and the food product may be enclosed within the heating chamber defined between the base pan 104 and the dome lid 102 (step 2504). A cooking input (e.g., a cooking temperature, a desired doneness, a degree of browning, etc.) may be input and received by the temperature controlling component 112 (step 2506). The temperature controlling component 112 may be operatively coupled to the heating element 1210, and the temperature controlling component 112 may adjust the heat output by the heating element 1210 based upon the cooking input (step 2508). Auxiliary heat may be provided by a flat bottom heating element 402 slidably coupled to the base pan 104 (step 2510). Thus, the roasting oven 100 may cook and/or brown a food product to a desired and/or selected temperature, doneness, degree of browning, etc. As described herein, the food product (e.g., the top of the food product) may further be uniformly browned by the roasting oven 100 (step 2512).

Figure 26:
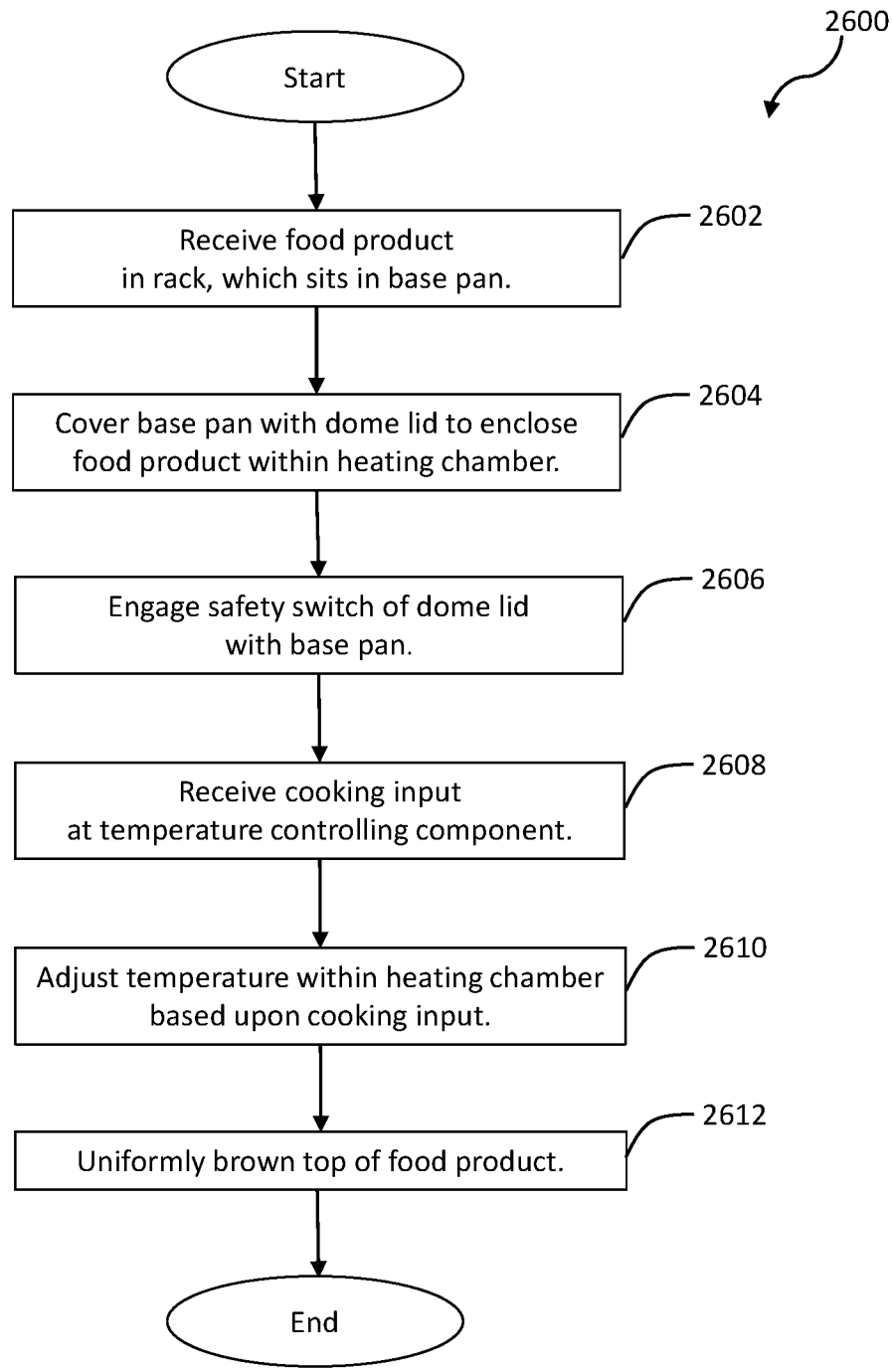
FIG. 26 shows a still further process for cooking a food product with a roasting oven as disclosed herein and in accordance with various illustrative embodiments.

Referring now to FIG. 26, a process 2600 for cooking a food product with a roasting oven 100 is shown. In various illustrative embodiments, the process 2600 may include receiving a food product in a tray or rack 402 that is configured to sit in the base pan 104 (step 2602). The base pan 104 may be covered by the dome lid 102, and the food product may be enclosed within the heating chamber defined between the base pan 104 and the dome lid 102 (step 2604). Engaging the safety switch 202 with the base pan 104 to allow power to flow to the heating belt 1210 (step 2606). A cooking input (e.g., a cooking temperature, a desired doneness, a degree of browning, etc.) may be input and received by the temperature controlling component 112 (step 2608). The temperature controlling component 112 may be operatively coupled to the heating element 1210, and the temperature controlling component 112 may adjust the heat output by the heating element 1210 based upon the cooking input (step 2610). Thus, the roasting oven 100 may cook and/or brown a food product to a desired and/or selected temperature, doneness, degree of browning, etc. As described herein, the food product (e.g., the top of the food product) may further be uniformly browned by the roasting oven 100 (step 2612).

Figure 27:
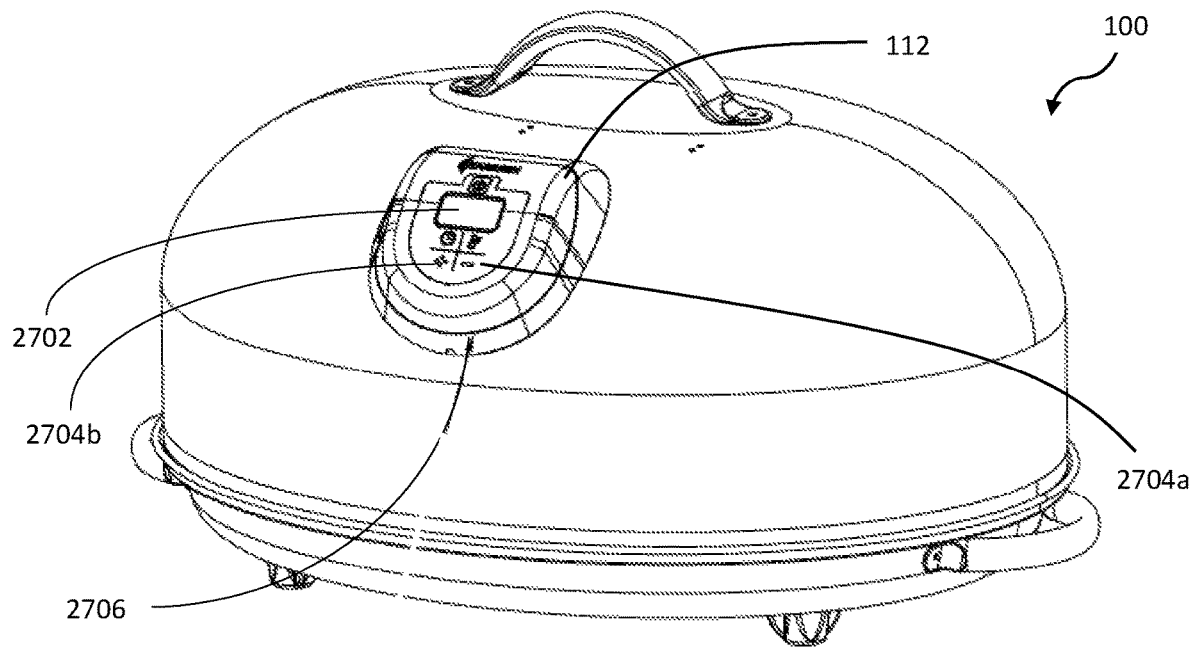
FIG. 27 shows an illustrative embodiment of the roasting oven having a temperature controlling component including a digital or LED display, operator input buttons and a control box.
Figure 28:
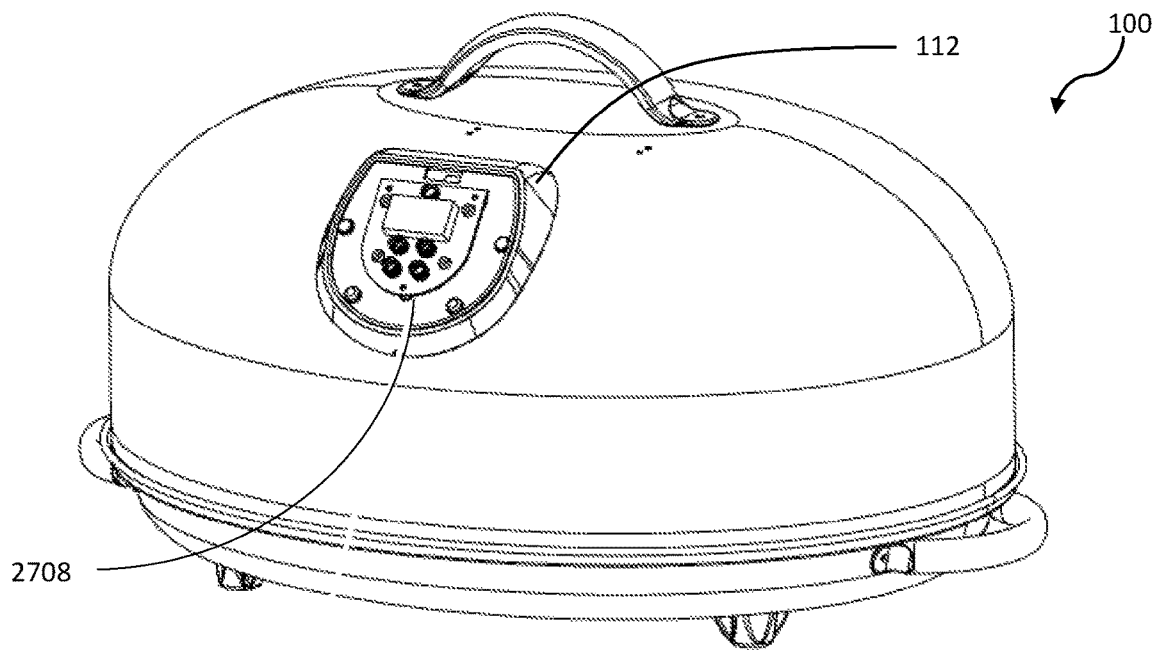
FIG. 28 shows an illustrative embodiment of the roasting oven having a front panel of the temperature control component removed.

Referring now to FIG. 27, there is shown an illustrative embodiment of the roasting oven 100 having a temperature controlling component 112 comprising a digital or LED display 2702, operator input buttons 2704a and 2704b, and a control box 2706. Referring now to FIG. 28, there is shown the interior of the temperature controlling component 112. The temperature controlling component is configured to receive operator input at the buttons 2704a and 2704b, such as when an operator desires to set, or change the temperature or cooking method. The digital or LED display 2702 is configured to display the selected temperature, the current temperature, the method of cooking, or the available methods of cooking.

Referring now to FIG. 28, there is shown an illustrative embodiment of the roasting oven 100 having a front panel of the temperature control component 112 removed. The temperature controlling component 112 comprises a control PCB 2708 with memory thereon, as well as a user interface component electrically coupled to the operator input buttons 2704a and 2704b. Isolation and separation of the control PCB 2708 from a separate PCB dedicated to power allows the temperature controlling component 112 to have a desirable size and shape.

Figure 29:
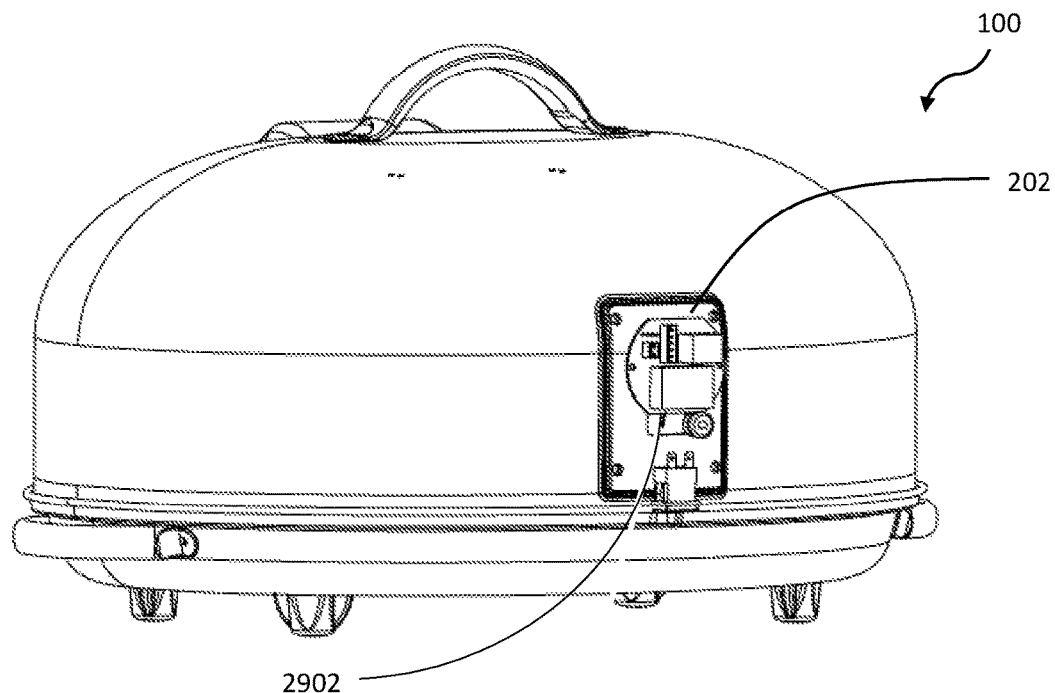
FIG. 29 shows an illustrative embodiment of the roasting oven from the rear.

Referring now to FIG. 29, there is shown an illustrative embodiment of the roasting oven 100 from the rear. The illustrative roasting oven 100 having an outer panel of the safety switch 202 removed. The safety switch 202 comprises a power PCB 2902. The power PCB 2902 delivers power to the roasting oven 100.

Figure 30:
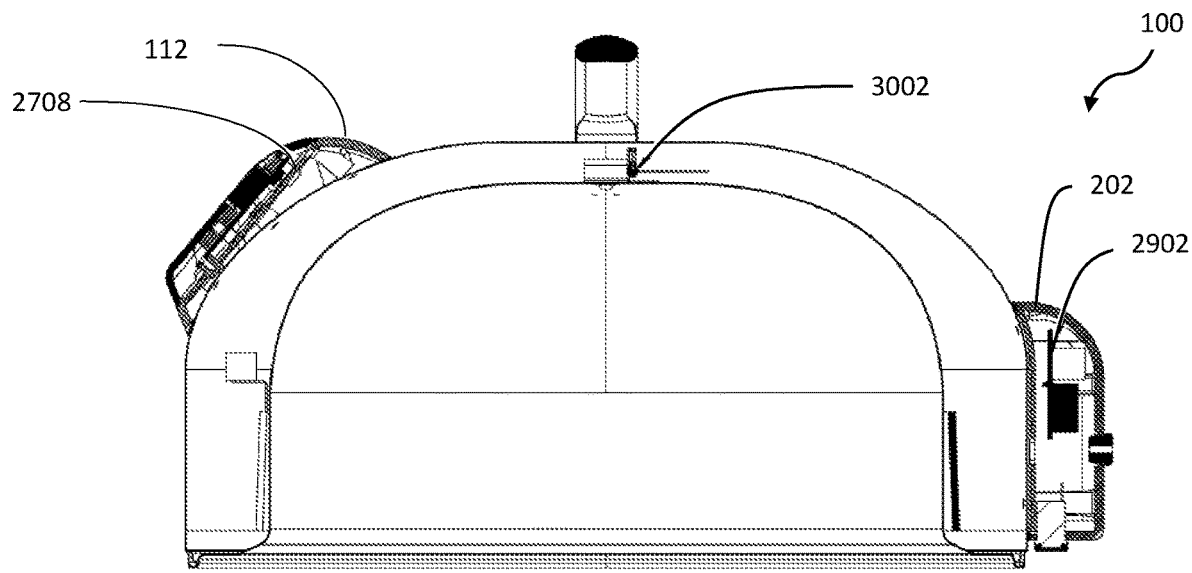
FIG. 30 shows a cross-sectional side view of an illustrative embodiment of the roasting oven.

Referring now to FIG. 30, there is shown a cross-section side view of an illustrative embodiment of the roasting oven 100. The control PCB 2708 is mounted within the temperature controlling component 112. The power PCB 2902 is mounted within the safety switch 202. A temperature sensor 3002 is mounted on the exterior surface of the inner wall 1010 at the top of the dome lid 102.

Figure 31:
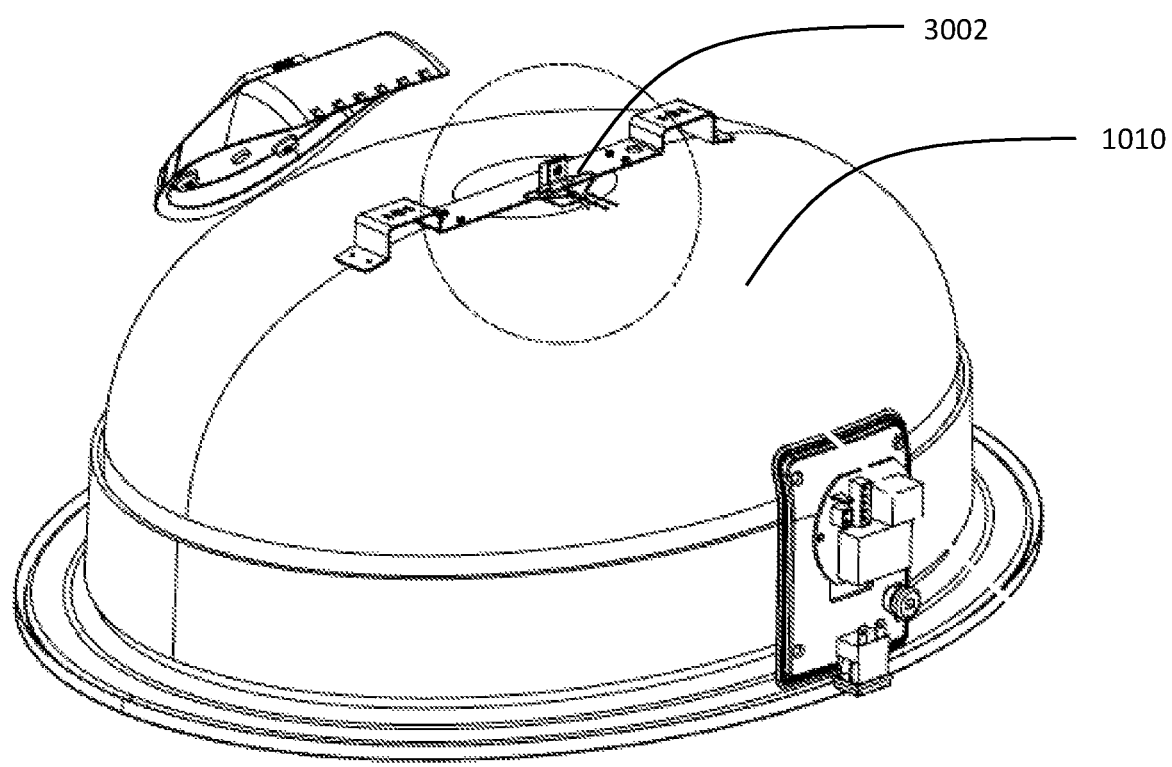
FIG. 31 shows the temperature sensor mounted on the inner wall.
Figure 32:
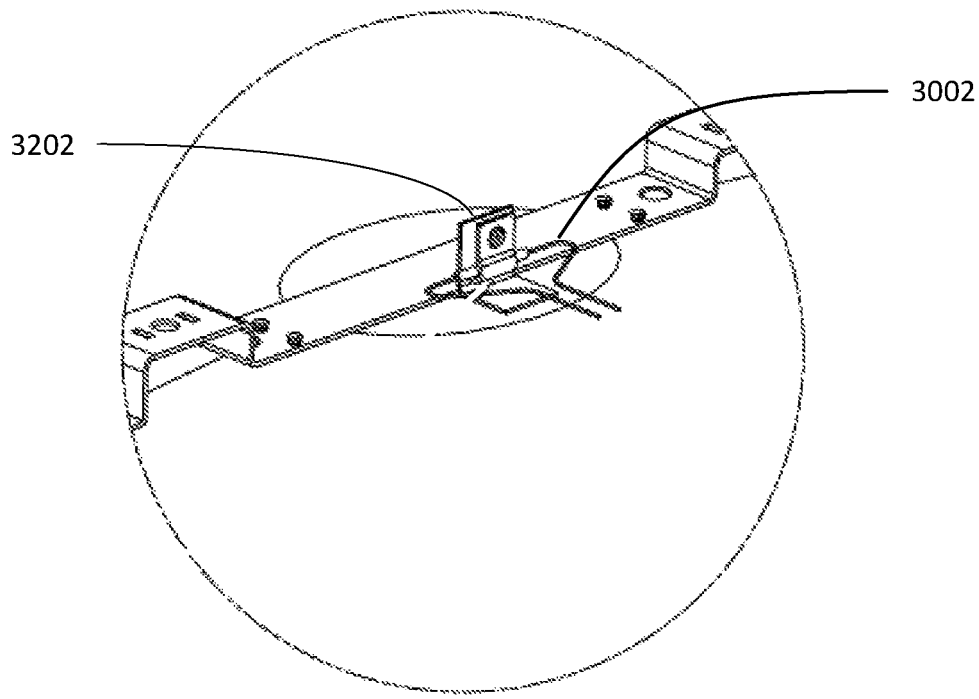
FIG. 32 shows a detailed view of the sensor mounted in a sensor bracket on the mounting bar.

Referring now to FIG. 31, there is shown the temperature sensor 3002 mounted on the inner wall 1010. The sensor 3002 is electrically coupled to the temperature controlling component 112. The temperature controlling component 112 may turn off power to the heating belt 1210 in response to a temperature sensed by the sensor 3002. Alternatively, the temperature controlling component 112 may turn on power to the heating belt 1210 in response to a temperature sensed by the sensor 3002. Referring now to FIG. 32, there is shown a detailed view of the sensor 3002 mounted in a sensor bracket 3202 on the mounting bar 1102.

Figure 33:
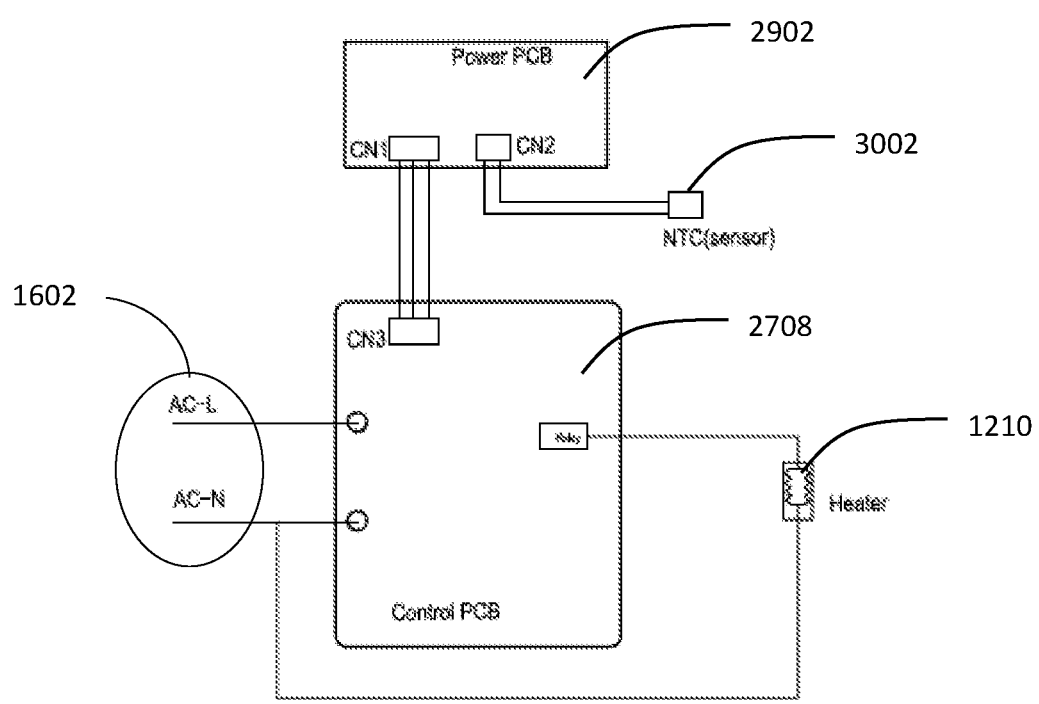
FIG. 33 shows an electrical circuit diagram for an illustrative roasting oven.

Referring now to FIG. 33, there is shown an electrical circuit diagram for an illustrative roasting oven 100. The roasting oven 100 may include the power supply 1602, the heating belt 1210, the power PCB 2902, the control PCB 2708, and a Negative Temperature Coefficient (NTC) temperature sensor 3002. The power supply 1602 is electrically coupled to the control PCB 2708 and to the heating belt 1210 through a parallel circuit. The heating belt is further electrically coupled to the control PCB 2708. The control PCB routes power from the power supply 1602 through an electrical coupling to the power PCB 2902. The power PCB 2902 receives temperature input from the NTC sensor 3002 through an electrical coupling. In various illustrative embodiments, and during operation, an operator of the roasting oven 100 may adjust the temperature controlling component 112 (e.g., by way of the buttons 2704a and 2704b) to adjust the operating temperature of the roasting oven 100. The control PCB can turn power on or off to the heating belt 1210 in response to a temperature sensed by the NTC sensor 3002, during operation, during a preheating stage, and the like. The heating belt 1210 may supply heat to the roasting oven 100 based upon a cooking input received at the buttons 2704a and 2704b and in response to a temperature detected or measured by sensor 3002. More particularly, the temperature controlling component 112 may include, in various illustrative embodiments a rheostat or potentiometer, which may be adjusted in response to a cooking input received at the buttons 2704a and 2704b of the temperature controlling component 112. As the cooking input is increased or decreased, the power supplied to the heating belt 1210 may be adjusted by the temperature controlling component 112, so that the heating belt 1210 generates more or less heat. The power supplied to the heating belt 1210 may further be adjusted (e.g., increased or decreased) based upon a temperature measurement.

The roasting oven 100 disclosed herein may therefore cook as well as uniformly brown a food product. More particularly, the outer surfaces (including a top surface, such as a turkey breast) of a food product may be uniformly browned by the roasting oven 100, because the heating element 1210 of the roaster oven 100 is disposed within the dome lid 102, such that heat radiates away from the lid and down over the food product. The heating element 1210 is further enclosed within the dome lid 102, so that heat is not directly applied to the food product, but indirectly, as it circulates within the dome lid 102. Moreover, because the dome lid 102 is large and extends over and around a large portion of the food product, the roasting oven 100 is capable of both browning a top surface (and side and/or other surfaces) of the food product as well as cooking the food product to a desired temperature or doneness.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. A double walled domed electric roasting oven comprising:
   a double walled dome lid formed by coupling a domed inner wall and a domed outer wall with a fastener, wherein the double walled dome lid has a dome lid height;
   domed inner wall includes an interior inner wall surface and the exterior inner wall surface;
   the domed outer wall includes an interior outer wall surface and an exterior outer wall surface;

a base pan that interfaces with a bottom of the double walled dome lid, wherein the base pan has a base pan height;

wherein the dome lid height is at least 2.5 times greater than the base pan height;

a temperature controlling component disposed on an exterior outer wall of the double walled dome lid, wherein the temperature controlling component includes a heating element that is electrically coupled to the temperature controlling component;

at least one domed outer wall opening associated with the domed outer wall;

a bracket welded to the exterior inner wall surface, wherein the bracket includes at least one bracket opening;

the double walled dome lid formed by coupling the domed inner wall and the domed outer wall with a fastener that passes though the bracket opening and the domed outer wall opening; and wherein the heating element is radially disposed about an exterior inner wall surface of the domed inner wall and is positioned within the domed outer wall.

2. The double walled domed electric roasting oven of claim 1 further comprising a handle component that includes at least one handle opening, wherein the fastener joins the bracket welded to the exterior inner wall surface, the domed outer wall and the handle by passing through the bracket opening, the domed outer wall lid opening and the handle opening.

3. The double walled domed electric roasting oven of claim 1 wherein the base pan has a height of greater than 1 inch and less than 2 inches.

4. The double walled domed electric roasting oven of claim 1 wherein the base pan that does not include a heating module.

5. The double walled domed electric roasting oven of claim 1 wherein the base pan includes a removable heating module.

6. The double walled domed electric roasting oven of claim 1 further comprising,
an inner rim that includes a gasket; and
an outer rim that interlocks with the inner rim and interfaces with the gasket.

7. The double walled domed electric roasting oven of claim 1 including an inner rim that receives an outer rim, which generates a seal when the outer rim interlocks with the inner rim.

8. The double walled domed electric roasting oven of claim 1 further comprising a safety switch mounted on the domed outer wall, wherein the safety switch interfaces with the base pan when the base pan interfaces with the bottom of the double walled dome lid, wherein the safety switch turns off power that is being transferred to the heating element when the double walled domed lid is separated from the base pan.

9. The double walled dome electric roasting oven of claim 1 having a shape selected from the group consisting of a substantially oval shape, a substantially circular shape, a substantially square shape and a substantially rectangular shape.

10. A double walled domed electric roasting oven comprising:
a domed inner wall that includes an interior inner wall surface and an exterior inner wall surface;
a domed outer wall that includes an interior outer wall surface and an exterior outer wall surface, wherein the domed outer wall includes at least one domed outer wall opening;
a bracket welded to the exterior inner wall surface, wherein the bracket includes at least one bracket opening;
a double walled dome lid formed by coupling the domed inner wall and the domed outer wall with a fastener that passes though the bracket opening and the domed outer wall opening, wherein the double walled dome lid has a dome lid height;
a base pan that interfaces with a bottom of the double walled dome lid, wherein the base pan has a base pan height;
wherein the dome lid height is at least 2.5 times greater than the base pan height;
a temperature controlling component disposed on the exterior outer wall of the double walled dome lid, wherein the temperature controlling component includes a heating element that is electrically coupled to the temperature controlling component; and
wherein the heating element is radially disposed about the exterior inner wall surface of the domed inner wall and positioned within the domed outer wall.

11. The double walled domed electric roasting oven of claim 10 further comprising a handle component that includes at least one handle opening, wherein the fastener joins the bracket welded to the exterior inner wall surface, the domed outer wall and the handle by passing through the bracket opening, the domed outer wall lid opening and the handle opening.

12. The double walled domed electric roasting oven of claim 10 wherein the base pan has a height of greater than 1 inch and less than 2 inches.

13. The double walled domed electric roasting oven of claim 10 wherein the base pan that does not include a heating module.

14. The double walled domed electric roasting oven of claim 10 wherein the base pan includes a removable heating module that is slidably coupled to the base pan.

15. The double walled domed electric roasting oven of claim 10 further comprising,
an inner rim that includes a gasket; and
an outer rim that interlocks with the inner rim and interfaces with the gasket.

16. The double walled domed electric roasting oven of claim 10 including an inner rim that receives an outer rim, which generates a seal when the outer rim interlocks with the inner rim.

17. The double walled domed electric roasting oven of claim 10 further comprising a safety switch mounted on the domed outer wall, wherein the safety switch interfaces with the base pan when the base pan interfaces with the bottom of the double walled dome lid.

18. The double walled domed electric roasting oven of claim 17 wherein the safety switch turns off power that is being transferred to the heating element when the double walled domed lid is separated from the base pan.

19. The double walled dome electric roasting oven of claim 10 having a shape selected from the group consisting of a substantially oval shape, a substantially circular shape, a substantially square shape and a substantially rectangular shape.

* * * * *